US011009913B2

(12) United States Patent
Hirakata et al.

(10) Patent No.: US 11,009,913 B2
(45) Date of Patent: May 18, 2021

(54) DISPLAY DEVICE

(71) Applicant: Semiconductor Energy Laboratory Co., Ltd., Atsugi (JP)

(72) Inventors: Yoshiharu Hirakata, Ebina (JP); Hiroyuki Miyake, Atsugi (JP); Seiko Inoue, Isehara (JP); Shunpei Yamazaki, Setagaya (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 15/986,099

(22) Filed: May 22, 2018

(65) Prior Publication Data
US 2019/0033919 A1   Jan. 31, 2019

Related U.S. Application Data

(63) Continuation of application No. 14/444,799, filed on Jul. 28, 2014, now abandoned.

(30) Foreign Application Priority Data

Aug. 2, 2013 (JP) ................. 2013-161577

(51) Int. Cl.
*G06F 1/16* (2006.01)
*G06F 3/041* (2006.01)
(52) U.S. Cl.
CPC ............ *G06F 1/1652* (2013.01); *G06F 3/041* (2013.01); *G06F 2203/04102* (2013.01)
(58) Field of Classification Search
None
See application file for complete search history.

(56) References Cited

U.S. PATENT DOCUMENTS

| 6,144,358 | A | 11/2000 | Narayanaswamy et al. |
| 7,176,947 | B2 | 2/2007 | Kudo et al. |
| 7,239,742 | B2 | 7/2007 | Ohtani et al. |
| RE40,821 | E | 7/2009 | Narayanaswamy et al. |
| 7,724,269 | B2 | 5/2010 | Kudo et al. |
| 7,970,443 | B2 | 6/2011 | Wong et al. |

(Continued)

FOREIGN PATENT DOCUMENTS

| CN | 001208881 A | 2/1999 |
| CN | 001519810 A | 8/2004 |

(Continued)

OTHER PUBLICATIONS

Chinese Office Action (Application No. 201480043745.4) dated Jul. 4, 2018.

(Continued)

*Primary Examiner* — Krishna P Neupane
(74) *Attorney, Agent, or Firm* — Robinson Intellectual Property Law Office; Eric J. Robinson

(57) ABSTRACT

A display device with low power consumption is provided. Furthermore, a display device in which an image is displayed in a region that can be used in a folded state is provided. The conceived display device includes a display portion that can be opened and folded, a sensing portion that senses a folded state of the display portion, and an image processing portion that generates, when the display portion is in the folded state, an image in which a black image is displayed in part of the display portion.

21 Claims, 18 Drawing Sheets

(56) References Cited

U.S. PATENT DOCUMENTS

| | | |
|---|---|---|
| 8,232,552 B2 | 7/2012 | Yano et al. |
| 8,427,420 B2 | 4/2013 | Yamazaki et al. |
| 8,487,844 B2 | 7/2013 | Koyama |
| 8,665,247 B2 | 3/2014 | Cok |
| 8,736,162 B2 | 5/2014 | Jin et al. |
| 8,803,816 B2 | 8/2014 | Kilpatrick, II et al. |
| 8,836,611 B2 | 9/2014 | Kilpatrick, II et al. |
| 8,860,632 B2 | 10/2014 | Kilpatrick, II et al. |
| 8,860,765 B2 | 10/2014 | Kilpatrick, II et al. |
| 8,863,038 B2 | 10/2014 | King et al. |
| 8,866,840 B2 | 10/2014 | Dahl et al. |
| 8,933,874 B2 | 1/2015 | Lundqvist et al. |
| 8,947,320 B2 | 2/2015 | King et al. |
| 9,009,984 B2 | 4/2015 | Caskey et al. |
| 9,047,799 B2 | 6/2015 | Yamazaki et al. |
| 9,361,853 B2 | 6/2016 | Yamazaki et al. |
| 9,448,592 B2 | 9/2016 | Jin et al. |
| 9,996,115 B2 | 6/2018 | Yamazaki et al. |
| 10,054,988 B2 | 8/2018 | Jin et al. |
| 10,528,084 B2 | 1/2020 | Jin et al. |
| 2001/0020928 A1 | 9/2001 | Yanagisawa et al. |
| 2006/0208993 A1 | 9/2006 | Jung |
| 2007/0097014 A1 | 5/2007 | Solomon et al. |
| 2008/0079680 A1 | 4/2008 | Fujita |
| 2008/0266277 A1 | 10/2008 | Ichikura et al. |
| 2010/0060664 A1 | 3/2010 | Kilpatrick, II et al. |
| 2010/0064244 A1 | 3/2010 | Kilpatrick, II et al. |
| 2010/0064536 A1 | 3/2010 | Caskey et al. |
| 2010/0066643 A1 | 3/2010 | King et al. |
| 2010/0079355 A1 | 4/2010 | Kilpatrick, II et al. |
| 2010/0085274 A1 | 4/2010 | Kilpatrick, II et al. |
| 2010/0085382 A1 | 4/2010 | Lundqvist et al. |
| 2010/0117975 A1 | 5/2010 | Cho |
| 2010/0201604 A1 | 8/2010 | Kee et al. |
| 2011/0050673 A1 | 3/2011 | Lee |
| 2011/0109351 A1* | 5/2011 | Yamazaki ........... H01L 27/1225 327/109 |
| 2011/0109591 A1* | 5/2011 | Kurokawa .......... G02F 1/13338 345/175 |
| 2011/0126141 A1 | 5/2011 | King et al. |
| 2011/0216064 A1* | 9/2011 | Dahl .................... G06F 1/1616 345/428 |
| 2012/0217516 A1 | 8/2012 | Hatano et al. |
| 2012/0262367 A1* | 10/2012 | Chiu .................... G06F 1/1626 345/156 |
| 2013/0010405 A1 | 1/2013 | Rothkopf et al. |
| 2013/0050270 A1* | 2/2013 | Joo ...................... G06F 1/1652 345/661 |
| 2013/0100053 A1* | 4/2013 | Kang ....................... G06F 3/03 345/173 |
| 2013/0321340 A1 | 12/2013 | Seo et al. |
| 2014/0111954 A1 | 4/2014 | Lee et al. |
| 2014/0152576 A1* | 6/2014 | Kim .................... G06F 3/03545 345/169 |
| 2014/0223343 A1* | 8/2014 | Lee ..................... G06F 3/04817 715/765 |
| 2014/0226275 A1 | 8/2014 | Ko et al. |
| 2014/0306985 A1 | 10/2014 | Jeong et al. |
| 2015/0009128 A1 | 1/2015 | Matsumoto |
| 2015/0022515 A1 | 1/2015 | Ikeda et al. |
| 2015/0022561 A1 | 1/2015 | Ikeda et al. |
| 2015/0277496 A1* | 10/2015 | Reeves ................. G06F 1/1641 345/1.2 |
| 2018/0348824 A1 | 12/2018 | Yamazaki et al. |
| 2020/0142448 A1 | 5/2020 | Jin et al. |

FOREIGN PATENT DOCUMENTS

| | | |
|---|---|---|
| CN | 101330679 A | 12/2008 |
| CN | 101426033 A | 5/2009 |
| CN | 201282487 Y | 7/2009 |
| CN | 102150094 A | 8/2011 |
| CN | 102150095 A | 8/2011 |
| CN | 102723058 A | 10/2012 |
| EP | 0898223 A | 2/1999 |
| EP | 2293279 A | 3/2011 |
| EP | 2500898 A | 9/2012 |
| EP | 3190476 A | 7/2017 |
| JP | 11-272205 A | 10/1999 |
| JP | 2002-247164 A | 8/2002 |
| JP | 2003-091269 A | 3/2003 |
| JP | 2004-013121 A | 1/2004 |
| JP | 2004-240235 A | 8/2004 |
| JP | 2004-258477 A | 9/2004 |
| JP | 2004-264516 A | 9/2004 |
| JP | 2004-361945 A | 12/2004 |
| JP | 2005-107004 A | 4/2005 |
| JP | 2005-165129 A | 6/2005 |
| JP | 2006-243621 A | 9/2006 |
| JP | 2008-077008 A | 4/2008 |
| JP | 2008-107790 A | 5/2008 |
| JP | 2008-243928 A | 10/2008 |
| JP | 2008-275733 A | 11/2008 |
| JP | 2009-089328 A | 4/2009 |
| JP | 2010-072335 A | 4/2010 |
| JP | 2010-178188 A | 8/2010 |
| JP | 2010-282181 A | 12/2010 |
| JP | 2011-048372 A | 3/2011 |
| JP | 2012-502368 | 1/2012 |
| JP | 2012-502372 | 1/2012 |
| JP | 2012-078798 A | 4/2012 |
| JP | 2012-185327 A | 9/2012 |
| JP | 2012-190794 A | 10/2012 |
| JP | 2012-198541 A | 10/2012 |
| KR | 2011-0053265 A | 5/2011 |
| KR | 2013-0007311 A | 1/2013 |
| WO | WO-2003/027825 | 4/2003 |
| WO | WO-2010/028394 | 3/2010 |
| WO | WO-2010/028397 | 3/2010 |
| WO | WO-2010/028399 | 3/2010 |
| WO | WO-2010/028402 | 3/2010 |
| WO | WO-2010/028403 | 3/2010 |
| WO | WO-2010/028404 | 3/2010 |
| WO | WO-2010/028405 | 3/2010 |
| WO | WO-2010/028406 | 3/2010 |
| WO | WO-2010/028407 | 3/2010 |
| WO | WO-2010/128616 | 11/2010 |

OTHER PUBLICATIONS

International Search Report (Application No. PCT/JP2014/069771) dated Oct. 7, 2014.

Written Opinion (Application No. PCT/JP2014/069771) dated Oct. 7, 2014.

Chinese Office Action (Application No. 201480043745.4) dated May 12, 2020.

* cited by examiner

FIG. 1A
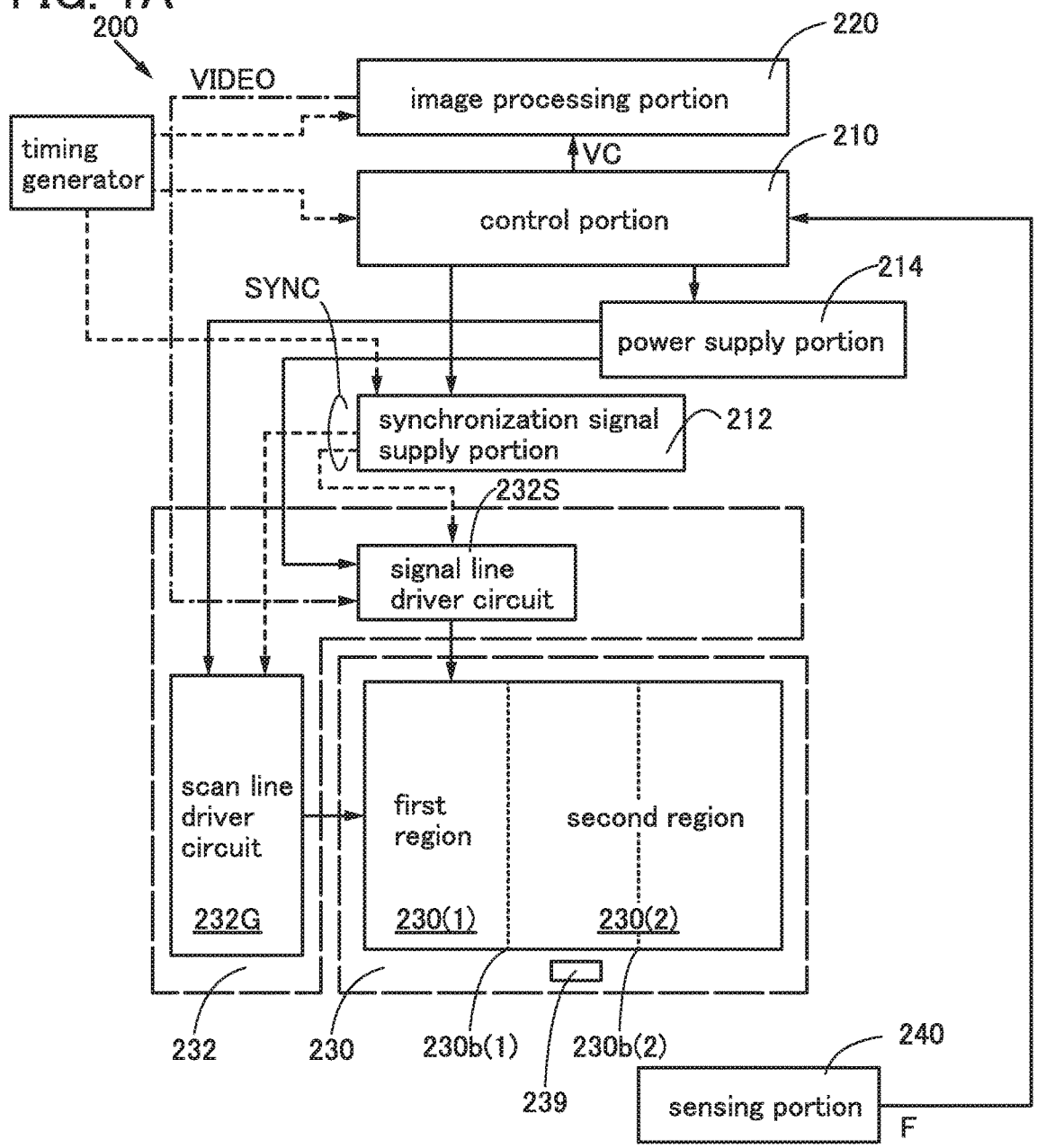
FIG. 1B1
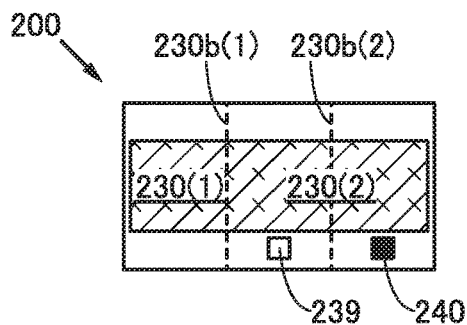
FIG. 1B2
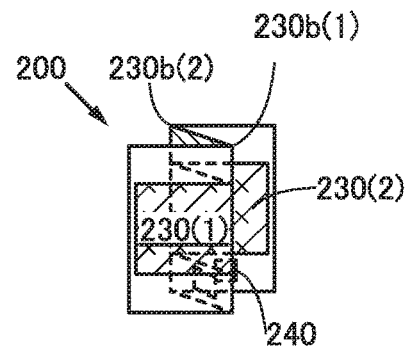

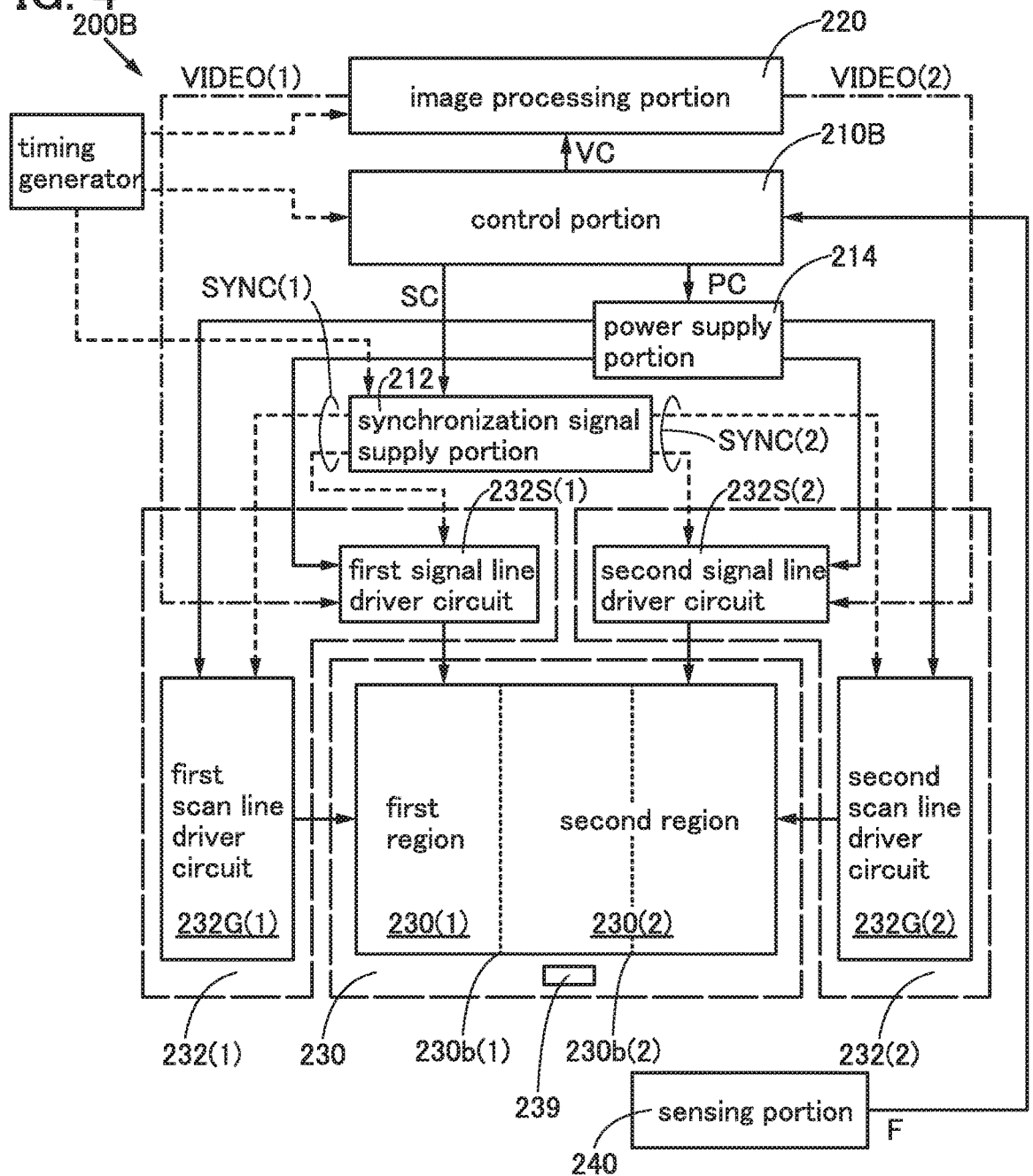

DISPLAY DEVICE

TECHNICAL FIELD

The present invention relates to an object, a method, or a manufacturing method. In addition, the present invention relates to a process, a machine, manufacture, or a composition of matter. In particular, the present invention relates to, for example, a human interface, a semiconductor device, a display device, a light-emitting device, a power storage device, a driving method thereof, or a manufacturing method thereof. For example, the present invention particularly relates to a display device. In particular, one embodiment of the present invention relates to a foldable display device.

BACKGROUND ART

The social infrastructures relating to means for transmitting information have advanced. This has made it possible to acquire, process, and send out many pieces and various kinds of information with the use of an information processor not only at home or office but also at other visiting places.

With this being the situation, portable information processors are under active development.

For example, portable information processors are often used outdoors, and force might be accidentally applied by dropping to the information processors and display devices included in them. As an example of a display device that is not easily broken, a display device having high adhesiveness between a structure body by which a light-emitting layers are partitioned and a second electrode layer is known (Patent Document 1).

A multi-panel electronic device including the following functions is known. First acceleration data is received from a first sensor coupled to a first portion of an electronic device. In addition, second acceleration data is further received from a second sensor coupled to a second portion of the electronic device, and a position of the first portion is movable with respect to a position of the second portion. Moreover, a structure of the electronic device is further determined at least on the basis of part of the first acceleration data and part of the second acceleration data (Patent Document 2).

REFERENCE

Patent Document

[Patent Document 1] Japanese Published Patent Application No. 2012-190794
[Patent Document 2] Japanese Published Patent Application No. 2012-502372

DISCLOSURE OF INVENTION

An object of one embodiment of the present invention is to provide a display device with low power consumption. Another object is to provide a display device in which an image is displayed in a region that can be used in a folded state. Another object is to provide a novel display device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a display device including: a foldable display portion including a first region and a second region; a sensing portion that senses an opened state or a folded state of the display portion and supplies a fold signal; a control portion that receives the fold signal and supplies an image control signal; an image processing portion that receives the image control signal and generates and supplies an image signal; and a driver circuit that receives the image signal and drives the display portion. The control portion supplies the image control signal that makes the image processing portion generate an image in which a black image is displayed in the second region of the display portion in a folded state.

Another embodiment of the present invention is the above display device in which the control portion includes an arithmetic unit and a storage unit that stores a program to be executed by the arithmetic unit. The program includes a first step of allowing interrupt processing; a second step of proceeding to a third step when the display portion is in an opened state and proceeding to a fourth step when the display portion is in a folded state; the third step of generating an image to be displayed in the first region and the second region; the fourth step of generating an image in which a black image is displayed in the second region; a fifth step of displaying an image on the display portion; a sixth step of proceeding to a seventh step when a termination instruction has been supplied in the interrupt processing and returning to the second step when the termination instruction has not been supplied in the interrupt processing; and the seventh step of terminating the program. The interrupt processing includes an eighth step of allowing operation and a ninth step of recovering from the interrupt processing.

The above display device of one embodiment of the present invention includes a display portion that can be opened and folded, a sensing portion that senses a folded state of the display portion, and an image processing portion that generates, when the display portion is in the folded state, an image in which a black image is displayed in part of the display portion. Thus, a region where display is unnecessary when part of the display portion is folded can display a black image. Consequently, a display device with low power consumption can be provided. Furthermore, a display device in which an image is displayed in a region that can be used in a folded state can be provided.

Another embodiment of the present invention is a display device including: a foldable display portion including a first region and a second region; a sensing portion that senses an opened state or a folded state of the display portion and supplies a fold signal; a control portion that receives the fold signal and supplies an image control signal and a synchronization control signal; an image processing portion that receives the image control signal and generates and supplies a first image signal and a second image signal; a synchronization signal supply portion that receives the synchronization control signal and supplies a first synchronization signal and a second synchronization signal; a first driver circuit that receives the first image signal and the first synchronization signal and drives the first region; and a second driver circuit that receives the second image signal and the second synchronization signal and drives the second region. The control portion supplies the image control signal that makes the image processing portion generate an image in which a black image is displayed in the second region of the display portion in a folded state and the synchronization control signal that stops selection of a scan line in the second region of the display portion in a folded state.

Another embodiment of the present invention is the above display device in which the control portion includes an arithmetic unit and a storage unit that stores a program to be executed by the arithmetic unit. The program includes a first step of allowing interrupt processing; a second step of proceeding to a third step when the display portion is in an opened state and proceeding to a fourth step when the display portion is in a folded state; the third step of proceeding to a fifth step when the opened state has not changed and proceeding to a sixth step when the opened state has changed to the folded state; the fourth step of proceeding to a seventh step when the folded state has not changed and proceeding to an eighth step when the folded state has changed to the opened state; the fifth step of executing processing 1; the sixth step of executing processing 2; the seventh step of executing processing 3; the eighth step of executing processing 4; a ninth step of proceeding to a tenth step when a termination instruction has been supplied in the interrupt processing and returning to the second step when the termination instruction has not been supplied in the interrupt processing; and the tenth step of terminating the program. The interrupt processing includes an eleventh step of allowing operation and a twelfth step of recovering from the interrupt processing.

Another embodiment of the present invention is the above display device in which the program includes the following four types of processing. The processing 1 includes a first step of making the synchronization signal supply portion supply synchronization signals to the first driver circuit and the second driver circuit a second step of making the image processing portion generate an image to be displayed in the first region and the second region; a third step of making the display portion display the image; and a fourth step of recovering from the processing 1. The processing 2 includes a first step of making the synchronization signal supply portion supply synchronization signals to the first driver circuit and the second driver circuit; a second step of making the image processing portion generate an image in which a black image is displayed in the second region; a third step of making the display portion display the image; a fourth step of making the synchronization signal supply portion sequentially stop supply of synchronization signals to the second driver circuit; and a fifth step of recovering from the processing 2. The processing 3 includes a first step of making the synchronization signal supply portion supply synchronization signals to the first driver circuit; a second step of making the image processing portion generate an image to be displayed in the first region; a third step of making the display portion display the image in the first region; and a fourth step of recovering from the processing 3. The processing 4 includes a first step of making the synchronization signal supply portion sequentially supply synchronization signals to the second driver circuit; a second step of making the image processing portion generate an image to be displayed in the first region and the second region; a third step of making the display portion display the image; and a fourth step of recovering from the processing 4.

The above display device of one embodiment of the present invention includes a display portion that can be opened and folded, a sensing portion that senses a folded state of the display portion, an image processing portion that generates, when the display portion is in the folded state, an image in which a black image is displayed in part of the display portion, and a synchronization signal supply portion that can stop the supply of a synchronization signal used for a portion where a black image is to be displayed. Thus, the display in a region where display is unnecessary when part of the display portion is folded can be stopped. Consequently, a display device with low power consumption can be provided. Furthermore, a display device in which an image is displayed in a region that can be used in a folded state can be provided.

Another embodiment of the present invention is the above display device further including a first power supply that supplies a power supply potential to the first driver circuit and a second power supply that supplies a power supply potential to the second driver circuit. The control portion supplies a power supply control signal to the second power supply in accordance with the fold signal. The second power supply stops supply of a power supply potential in accordance with the power supply control signal.

The above display device of one embodiment of the present invention includes a display portion that can be opened and folded, a synchronization signal supply portion that can stop the supply of a synchronization signal used for a portion where a black image is to be displayed, and a power supply that can stop the supply of a power supply potential used for a portion where a black image is to be displayed. Thus, the display in a region where display is unnecessary when part of the display portion is folded can be stopped. Consequently, a display device with low power consumption can be provided. Furthermore, a display device in which an image is displayed in a region that can be used in a folded state can be provided.

Another embodiment of the present invention is the above display device which further includes a magnet and in which the sensing portion includes a magnetic sensor. The magnet is placed at a position such that the magnetic sensor can sense an opened state or a folded state of the display portion.

The above display device of one embodiment of the present invention includes a display portion that can be opened and folded, a magnet and a sensing portion including a magnetic sensor that are placed to sense a folded state of the display portion, and an image processing portion that generates, when the display portion is in the folded state, an image in which a black image is displayed in part of the display portion. Thus, a region where display is unnecessary when part of the display portion is folded can display a black image. Moreover, the folded state can be maintained by a magnetic force of the magnet. Consequently, a display device with low power consumption can be provided. Furthermore, a display device in which an image is displayed in a region that can be used in a folded state can be provided.

According to one embodiment of the present invention, a display device with low power consumption can be provided. Furthermore, a display device in which an image is displayed in a region that can be used in a folded state can be provided.

BRIEF DESCRIPTION OF DRAWINGS

FIGS. 1A, 1B1, and 1B2 are a block diagram and schematic views illustrating a structure of a display device of an embodiment.

FIG. 4 is a block diagram illustrating a structure of a display device of an embodiment.

BEST MODE FOR CARRYING OUT THE INVENTION

Figure 2A:
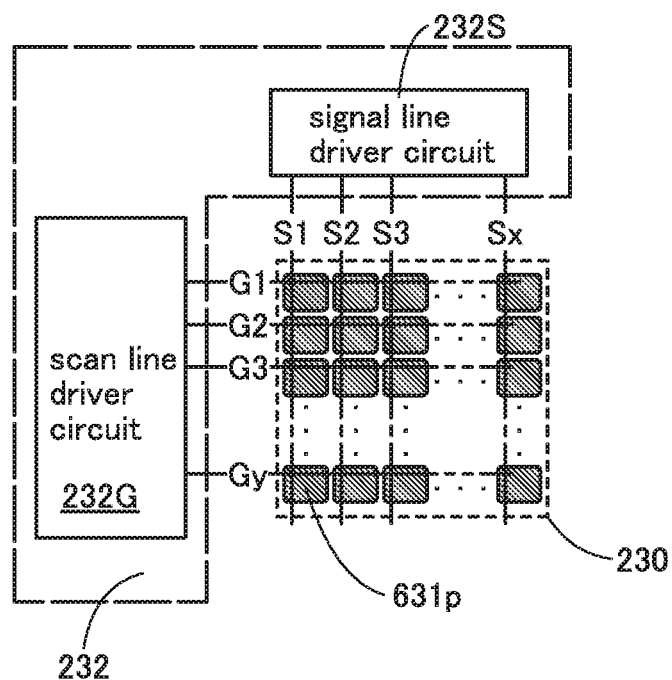
FIGS. 2A and 2B are a block diagram and a circuit diagram illustrating a structure of a display portion in a display device of an embodiment.

Embodiments will be described in detail with reference to drawings. Note that the present invention is not limited to the description below, and it is easily understood by those skilled in the art that various changes and modifications can be made without departing from the spirit and scope of the present invention. Therefore, the present invention should not be construed as being limited to the description in the following embodiments. Note that in the structures of the invention described below, the same portions or portions having similar functions are denoted by the same reference numerals in different drawings, and description of such portions is not repeated.

Embodiment 1

In this embodiment, a structure of a display device of one embodiment of the present invention is described with reference to FIGS. 1A, 1B1, and 1B2, FIGS. 2A and 2B, and FIGS. 3A and 3B.

FIGS. 1A, 1B1, and 1B2 are a block diagram and schematic views illustrating the structure of the display device of one embodiment of the present invention.

Figure 2B:
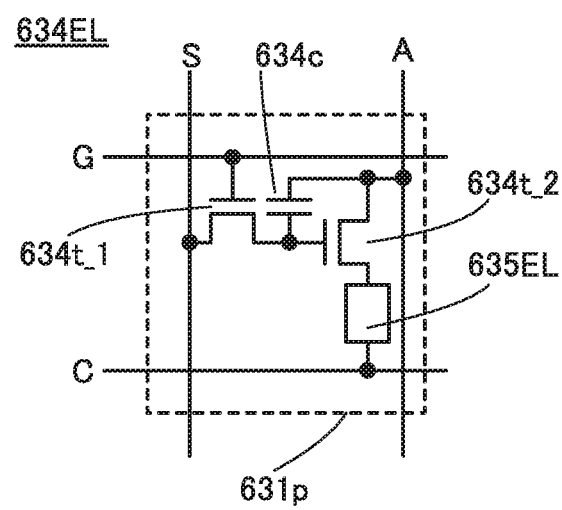

FIGS. 2A and 2B illustrate a display portion that can be used in the display device of one embodiment of the present invention. FIG. 2A is a block diagram illustrating the structure of the display portion, and FIG. 2B is a circuit diagram illustrating a pixel circuit in which an electroluminescent (EL) element is used as a display element.

Figure 3A:
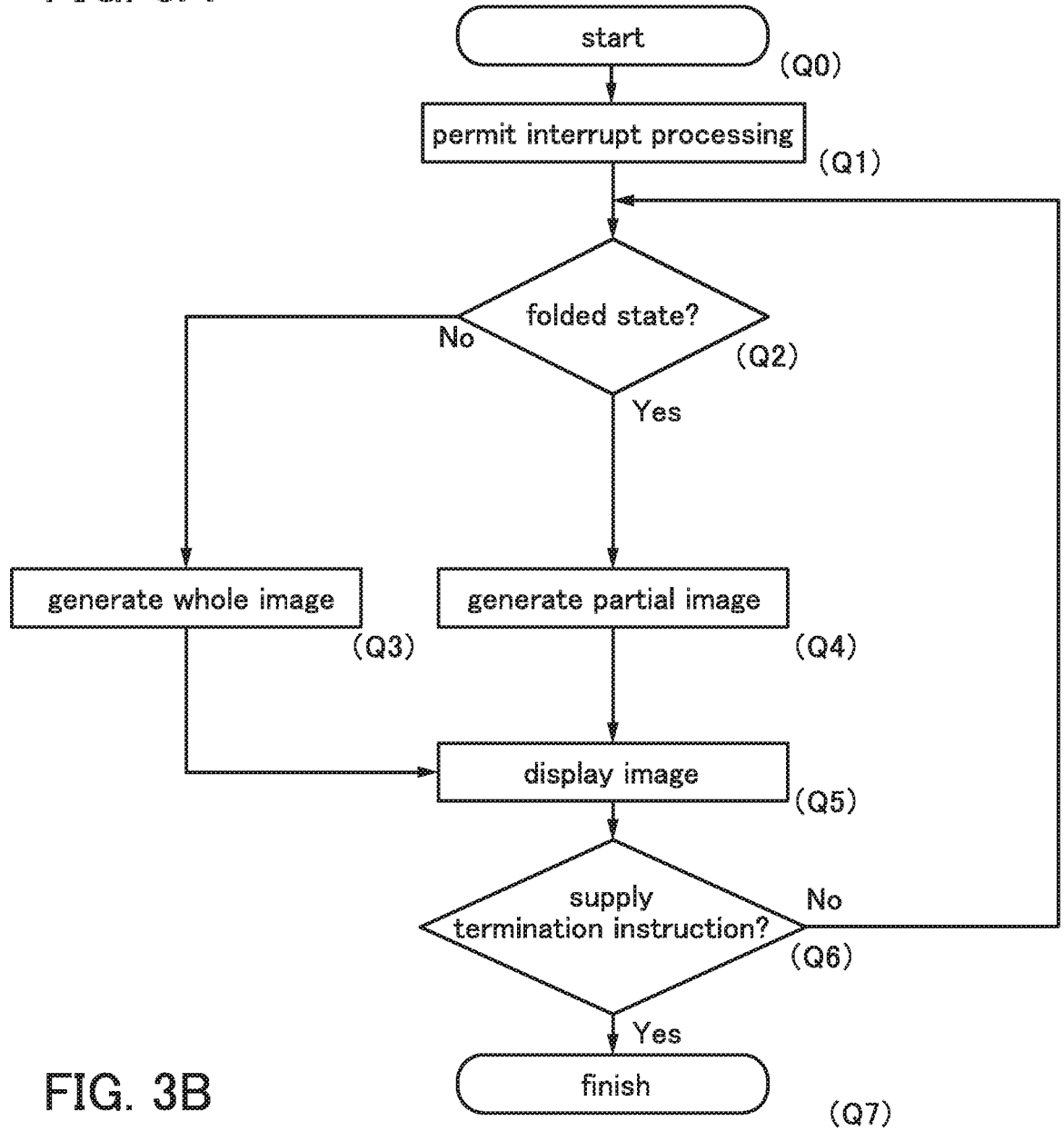
FIGS. 3A and 3B are flow charts illustrating the operation of a control portion in a display device of an embodiment.
Figure 3B:
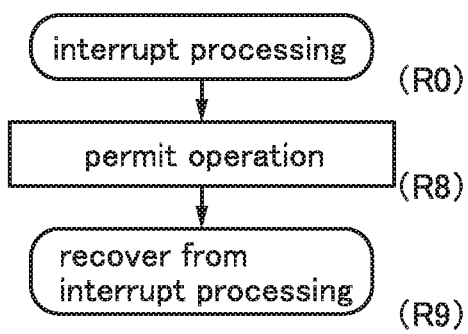

FIGS. 3A and 3B are flow charts illustrating the operation of a control portion of the display device of one embodiment of the present invention. FIG. 3A is a flow chart illustrating main processing, and FIG. 3B is a flow chart illustrating interrupt processing.

A display device 200 described in this embodiment includes a foldable display portion 230 including a first region 230(1) and a second region 230(2); a sensing portion 240 that senses an opened state or a folded state of the display portion 230 and supplies a fold signal F; a control portion 210 that receives the fold signal F and supplies an image control signal VC; an image processing portion 220 that receives the image control signal VC and supplies an image signal VIDEO; and driver circuits 232 that receive the image signal VIDEO and drive the display portion 230 (see FIG. 1A). Note that the first region 230(1) refers to a region seen from a user regardless of an opening state and a folded state. Further, the second region 230(2) refers to a region that is inside in a folded state and is not seen from a user.

The control portion 210 supplies the image control signal VC that makes the image processing portion 220 generate an image in which a black image is displayed in the second region 230(2) of the display portion 230 in a folded state.

The control portion 210 of the display device 200 described in this embodiment includes an arithmetic unit and a storage unit that stores a program to be executed by the arithmetic unit. The program includes the following steps.

In a first step, the interrupt processing is allowed (FIG. 3A (Q1)). Note that when the interrupt processing is allowed, the arithmetic unit can receive an instruction to execute the interrupt processing. The arithmetic unit that has received the instruction to execute the interrupt processing stops the main processing and executes the interrupt processing. For example, the arithmetic unit that has received an event associated with the instruction stops the main processing, executes the interrupt processing, and stores the execution result of the interrupt processing in the storage unit. Then, the arithmetic unit that has recovered from the interrupt processing can resume the main processing on the basis of the execution result of the interrupt processing.

In a second step, the operation proceeds to a third step when the display portion 230 is in an opened state and proceeds to a fourth step when the display portion 230 is in a folded state (FIG. 3A (Q2)). Specifically, a fold signal F is acquired and is used to determine whether the display portion 230 is in an opened state or in a folded state.

In the third step, an image to be displayed in the first region 230(1) and the second region 230(2) is generated (FIG. 3A (Q3)). Note that since the display portion 230 is opened, an image can be displayed using the entire display portion 230, that is, the first region 230(1) and the second region 230(2).

In the fourth step, an image in which a black image is displayed in the second region 230(2) is generated (FIG. 3A (Q4)). Note that since the display portion 230 is folded, an image can be displayed using part of the display portion 230, that is, only the first region 230(1).

In a fifth step, an image is displayed in the display portion 230 (FIG. 3A (Q5)).

In a sixth step, the operation proceeds to a seventh step when a termination instruction has been supplied in the interrupt processing and returns to the second step when the termination instruction has not been supplied in the interrupt processing (FIG. 3A (Q6)).

In the seventh step, the program is terminated (FIG. 3A (Q7)).

The interrupt processing includes an eighth step of allowing operation and a ninth step of recovering from the interrupt processing (FIG. 3B (R8) and (R9)). Note that a variety of operations can be performed in the interrupt processing. For example, a user of the display device 200 can give an instruction to select an image to be displayed or an instruction to terminate the program.

The above display device 200 of one embodiment of the present invention includes the display portion 230 that can be opened and folded, the sensing portion 240 that senses a folded state of the display portion 230, and the image processing portion 220 that generates, when the display portion 230 is in the folded state, an image in which a black image is displayed in part of the display portion 230. Thus, a region where display is unnecessary when part of the display portion 230 is folded can display a black image. Consequently, a display device with low power consumption can be provided. Furthermore, a display device in which an image is displayed in a region that can be used in a folded state can be provided.

In addition, the display device 200 described as an example in this embodiment includes a power supply portion 214 that supplies power supply potential to the driver circuits 232 and a synchronization signal supply portion 212 that supplies a synchronization signal SYNC to the driver circuits 232.

Figure 14:
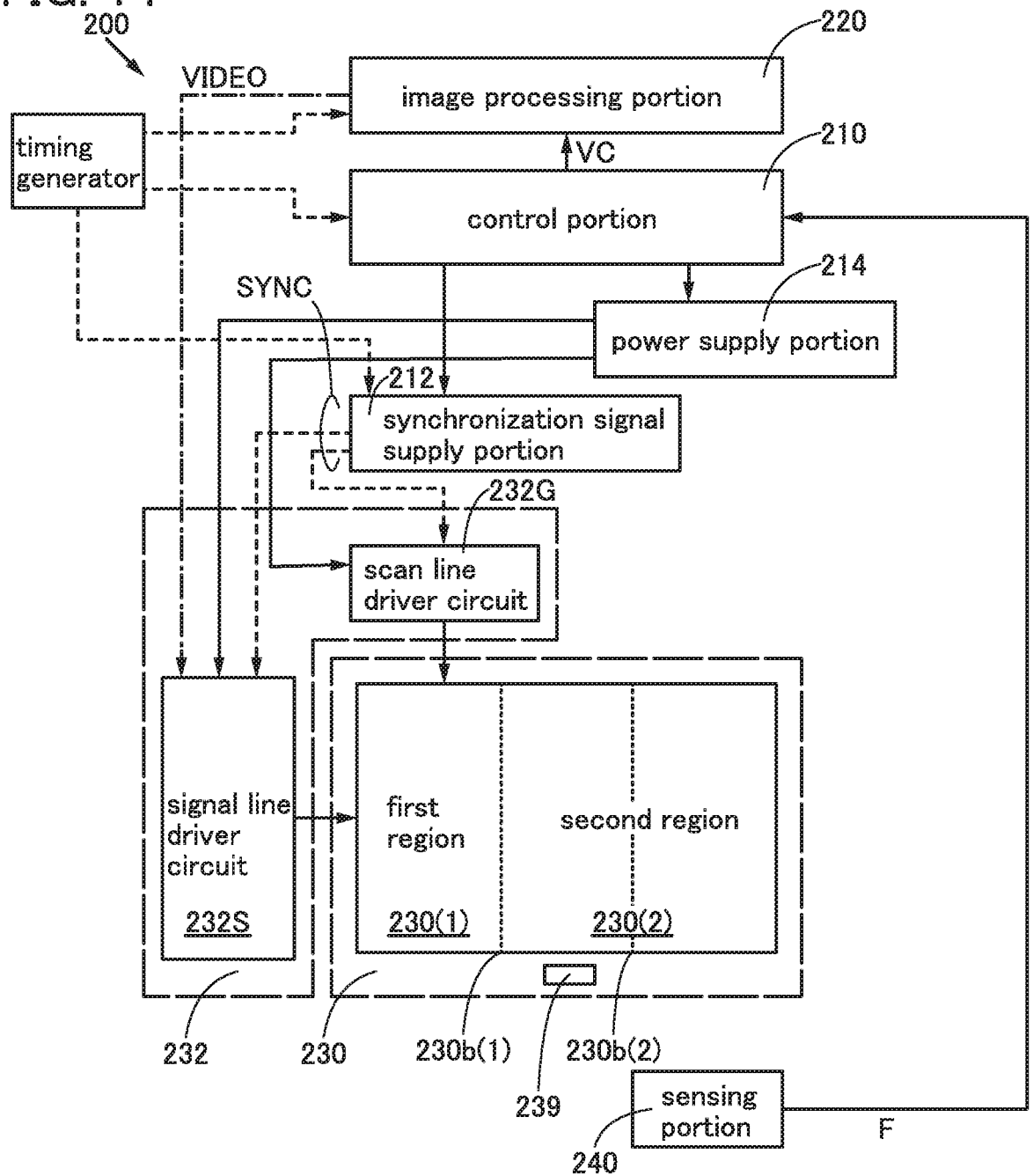
FIG. 14 is a block diagram illustrating a structure of a display portion in a display device of an embodiment.
Figure 15A:
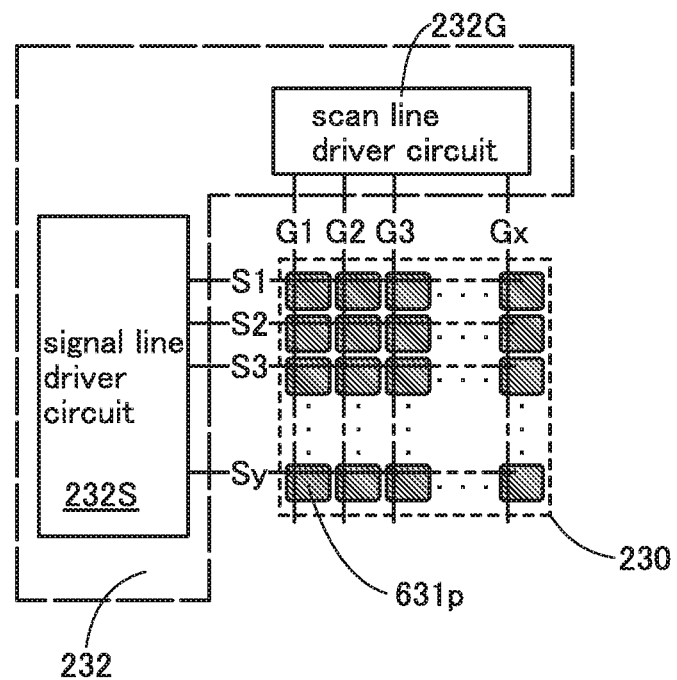
FIGS. 15A and 15B are a block diagram and a circuit diagram illustrating a structure of a display portion in a display device of an embodiment.
Figure 15B:
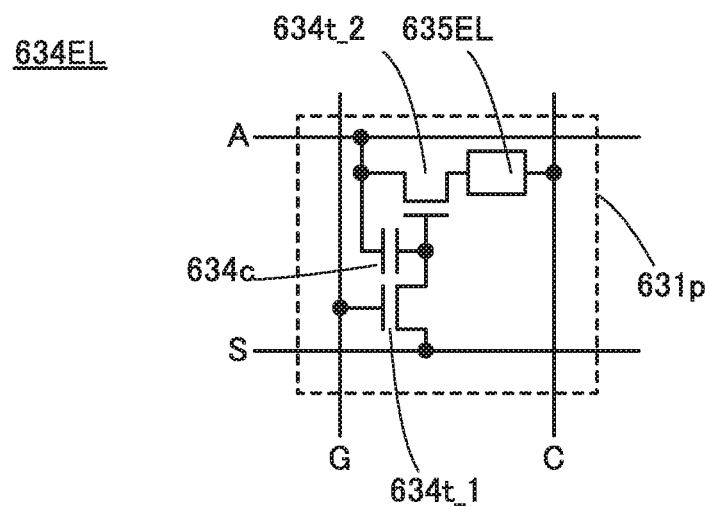

The driver circuits 232 include a scan line driver circuit 232G and a signal line driver circuit 232S. Note that as shown in FIG. 14, the scan line driver circuit 232G and the signal line driver circuit 232S in FIG. 1A may be replaced with each other. Similarly, as shown in FIG. 15A, the scan line driver circuit 232G and the signal line driver circuit 232S in FIG. 2A may be replaced with each other. In that case, as shown in FIG. 15B, a pixel 631$p$ is rotated by 90°.

The sensing portion 240 senses a sign 239 and senses a folded state of the display portion 230.

The sign 239 is placed, for example, in the vicinity of the display portion 230 so that the positional relation between the sign 239 and the sensing portion 240 changes in accordance with the opened state or the folded state of the display portion 230. Thus, the sensing portion 240 can sense the opened state or the folded state of the display portion 230 and supply a fold signal F.

Elements included in the display device 200 of one embodiment of the present invention are described below.

<<Foldable Display Portion>>

The foldable display portion 230 includes the first region 230(1) and the second region 230(2). The display portion 230 includes a display panel provided with display elements and a housing supporting the display panel.

The display panel includes a pixel portion in the first region 230(1) and the second region 230(2). Pixels are arranged such that a continuous image is displayed in the first region 230(1) and the second region 230(2). For example, pixels are arranged at regular intervals throughout the first and second regions so that a user does not recognize a boundary 230$b$(1) between the first region 230(1) and the second region 230(2) (see FIG. 1A).

The pixel portion includes a plurality of pixels, a plurality of scan lines, and a plurality of signal lines.

Each of the pixels includes a pixel circuit electrically connected to one scan line and one signal line and a display element electrically connected to the pixel circuit.

A display panel that can be used for the foldable display portion 230 includes, for example, a flexible substrate and display elements over the substrate. For example, the display panel can be bent with a curvature radius of greater than or equal to 1 mm and less than or equal to 100 mm with one surface on which an image can be displayed facing either inward or outward. Specifically, the display panel can have a structure in which an inorganic film provided with pixels is sandwiched between flexible films.

A housing that can be used for the foldable display portion 230 includes a hinge that can be folded at, for example, the boundary 230$b$(1) (see FIGS. 1B1 and 1B2).

The display portion 230 described in this embodiment is foldable in three parts; however, one embodiment of the present invention is not limited to such a structure. Specifically, the display portion 230 may be foldable in two parts or in four or more parts. A larger foldable number leads to a smaller external shape in a folded state, resulting in higher portability.

The display portion 230 can be folded at the boundary 230$b$(1) between the first region 230(1) and the second region 230(2).

FIG. 1B1 illustrates a state where the display portion 230 is opened flat.

FIG. 1B2 schematically illustrates a state where the display portion 230 is bent, specifically, a state where the display portion 230 is bent outward at the boundary 230$b$(1) and bent inward at a boundary 230$b$(2) so as to be folded in three parts.

In particular, in a folded state of the display device 200, the first region 230(1) is preferably placed on the outer side of the display device 200. In that case, a user can see an image displayed in the first region 230(1) in a folded state.

Note that an example of a structure of the foldable display portion 230 is described in detail in Embodiment 3.

<<Driver Circuit>>

The driver circuits 232 include the scan line driver circuit 232G and the signal line driver circuit 232S. The driver circuits 232 can be formed using, for example, any of a variety of sequential circuits such as a shift register. In the case where a driver circuit that is formed using an LSI is placed in a flexible display portion, the driver circuit is placed in a portion other than a bendable portion. Note that a driver circuit that can be formed in the same process as the pixel circuit is preferable because it can be placed in a bendable portion of a flexible display portion and therefore has a small limit in its position.

The scan line driver circuit 232G receives power supply potential and a synchronization signal SYNC and supplies a scan line selection signal.

The signal line driver circuit 232S receives power supply potential, a synchronization signal SYNC, and an image signal VIDEO and supplies an image signal.

A scan line selection signal is supplied to the display portion 230, whereby one scan line and pixels connected to the scan line are selected.

Image signals are supplied to pixels to which a scan line selection signal is supplied, and pixel circuits in the pixels store the image signals. In addition, display elements in the pixels perform display in accordance with the image signals.

<<Synchronization Signal Supply Portion>>

The synchronization signal supply portion 212 supplies a synchronization signal SYNC. The synchronization signal SYNC is used for synchronous operation of the driver circuits 232. Examples of the synchronization signal SYNC include a vertical synchronization signal and a horizontal synchronization signal, a start pulse signal SP, a latch signal LP, a pulse width control signal PWC, and a clock signal CLK.

<<Power Supply Portion>>

The power supply portion 214 supplies power supply potential. As the power supply potential, at least one of a high power supply potential (e.g., VDD) and a low power supply potential (e.g., VSS or GND) can be supplied. There is also a case where a plurality of high power supply potentials (e.g., VDD1 and VDD2) are supplied.

<<Image Processing Portion>>

The image processing portion 220 receives an image control signal VC, generates an image, and supplies an image signal VIDEO of the generated image.

The image signal VIDEO includes data on an image to be displayed in the first region 230(1) and the second region 230(2) of the display portion 230.

For example, the image processing portion 220 can generate, in accordance with the image control signal VC, one image to be displayed in the first region 230(1) and the second region 230(2). Moreover, the image processing portion 220 can generate, in accordance with the image control signal VC, one image in which a black image, for example, is displayed in the second region 230(2). For example, an image with the darkest gray level among gray levels that can be displayed by display elements is referred to as a black image.

When display elements display a black image, power consumption can be made lower than that for displaying other images (e.g., a white image or a gray image), resulting in a reduction in the power consumption of the display device 200.

Specifically, power consumed by the second region 230(2) that is folded so that display cannot be seen can be reduced.

A light-emitting element is an example of a display element that consumes less power when displaying a black image than when displaying other images. Note that in the case where display elements consume the least power at a gray level different from the darkest gray level that can be displayed by the display elements, an image with that gray level may be displayed instead of a black image.

<<Sensing Portion and Sign>>

The sensing portion 240 senses an opened state or a folded state of the display portion 230 and supplies a fold signal F. Note that the fold signal F includes data indicating an opened state or data indicating a folded state.

The sensing portion 240 is provided with a sensor that senses the sign 239 that is close thereto. The sensor senses the sign 239 placed in the vicinity of the display portion 230, whereby the sensing portion 240 can supply a fold signal F corresponding to the folded state of the display portion 230.

For example, the shape or place of an object such as a protrusion, an electromagnetic wave such as light, an electric wave, or a magnetic force, or the like can serve as the sign 239. Specifically, the above serving as the sign 239 may have different polarities (e.g., the N- and S-poles of a magnet) or different signals (e.g., electromagnetic waves which are modulated by different methods), for example.

A sensor that can identify the sign 239 is selected as the sensor included in the sensing portion 240.

Specifically, in the case where a structure having different shapes or in different places (e.g., a protrusion) is used as the sign 239, a switch or the like having different shapes or in different places can be used for the sensor so that the structure can be identified. Alternatively, in the case where light is used as the sign 239, a photoelectric conversion element or the like can be used for the sensor. In the case where an electric wave is used as the sign 239, an antenna or the like can be used for the sensor. In the case where a magnet is used as the sign 239, a magnetic sensor or the like can be used for the sensor.

Note that the sensing portion 240 may sense acceleration, a direction, a global positioning system (GPS) signal, temperature, humidity, or the like and supply data thereon in addition to the fold signal F.

A structure in which a magnet is used as the sign 239 and a magnetic sensor that senses a magnetic force of the magnet is used for the sensing portion 240 will be described.

The display device 200 includes a magnet as the sign 239, and the sensing portion 240 includes a magnetic sensor. The magnet is placed at a position such that the magnetic sensor can sense an opened state or a folded state of the display portion 230.

The display device 200 described in this embodiment includes the display portion 230 that can be opened and folded, a magnet (the sign 239) and the sensing portion 240 including a magnetic sensor that are placed to sense a folded state of the display portion 230, and the image processing portion 220 that generates, when the display portion is in the folded state, an image in which a black image is displayed in part of the display portion 230 (specifically, the second region). Thus, a region (specifically, the second region) where display is unnecessary when part of the display portion 230 is folded can display a black image. Moreover, the folded state can be maintained by a magnetic force of the magnet. Consequently, a display device with low power consumption can be provided. Furthermore, a display device in which an image is displayed in a region that can be used in a folded state can be provided. Furthermore, a display device that is prevented from being changed from a folded state to an opened state unintentionally can be provided.

<<Control Portion>>

The control portion 210 can receive a fold signal F and supply an image control signal VC. The control portion 210 may also supply signals for controlling the power supply portion 214 and the synchronization signal supply portion 212.

The image control signal VC is a signal for controlling the image processing portion 220. Examples of the image control signal VC include a signal that makes the image processing portion 220 generate different images in accordance with the opened state or the folded state of the display portion 230.

<<Timing Generator>>

A timing generator generates and supplies a reference clock signal or the like that the display device 200 needs.

<<Structure of Display Portion 230>>

The display portion 230 includes a plurality of pixels 631p and wirings that connect the plurality of pixels 631p (see FIG. 2A and FIG. 15A). Note that the kinds and number of the wirings are determined as appropriate depending on the structure, number, and arrangement of the pixels 631p.

Each of the pixels 631p is electrically connected to at least one scan line and one signal line.

For example, in the case where the pixels 631p are arranged in a matrix of x columns and y rows in the display portion 230, signal lines S1 to Sx and scan lines G1 to Gy are provided in the display portion 230 (see FIG. 2A and FIG. 15A). The scan lines G1 to Gy can supply scan line selection signals to the respective rows. The signal lines S to Sx can supply image signals to pixels to which a scan line selection signal is supplied.

<<Structure of Pixel 631p>>

The pixel 631p includes a display element and a pixel circuit including the display element.

The pixel circuit holds the supplied image signal and makes the display element display a gray level corresponding to the image signal. Note that the structure of the pixel circuit is selected as appropriate in accordance with the kind or the driving method of the display element.

As the display element, an EL element, electronic ink utilizing electrophoresis, a liquid crystal element, or the like can be used.

FIG. 2B and FIG. 15B each illustrate, as an example of the pixel circuit, a structure in which an EL element is used as the display element.

A pixel circuit 634EL includes a first transistor 634t_1 including a gate electrode electrically connected to a scan line G through which a scan line selection signal can be supplied, a first electrode electrically connected to a signal line S through which an image signal can be supplied, and a second electrode electrically connected to a first electrode of a capacitor 634c.

The pixel circuit 634EL also includes a second transistor 634t_2 including a gate electrode electrically connected to a second electrode of the first transistor 634t_1, a first electrode electrically connected to a second electrode of the capacitor 634c, and a second electrode electrically connected to a first electrode of an EL element 635EL.

The second electrode of the capacitor 634c and the first electrode of the second transistor 634t_2 are electrically connected to a wiring A through which power supply potential and a potential needed for light emission of the EL element 635EL can be supplied. Note that the potential of the wiring A may be constant or may change in a pulsed manner every certain period. A second electrode of the EL element 635EL is electrically connected to a wiring C through which a common potential can be supplied. Note that the difference between the power supply potential and the common potential is larger than the emission start voltage of the EL element 635EL.

The EL element 635EL includes a layer containing a light-emitting organic compound between a pair of electrodes.

<<Transistor>>

The second transistor 634t_2 supplies a current corresponding to the potential of the signal line S to control the light emission of the EL element 635EL. The second transistor 634t_2 includes silicon, an oxide semiconductor, or the like in a region where a channel is formed.

As an example of a transistor that can be suitably used as the first transistor 634t_1 or the second transistor 634t_2, a transistor including an oxide semiconductor can be given.

A transistor including an oxide semiconductor film can have leakage current between a source and a drain in an off state (off-state current) much lower than that of a conventional transistor including silicon. An example of a structure of the transistor that can be suitably used as the first transistor 634t_1 or the second transistor 634t_2 is described in Embodiment 4.

This embodiment can be combined with any of the other embodiments in this specification as appropriate.

Embodiment 2

In this embodiment, a structure of a display device of one embodiment of the present invention is described with reference to FIG. 4, FIGS. 5A and 5B, and FIGS. 6A to 6D.

FIG. 4 is a block diagram illustrating the structure of the display device of one embodiment of the present invention.

Figure 5A:
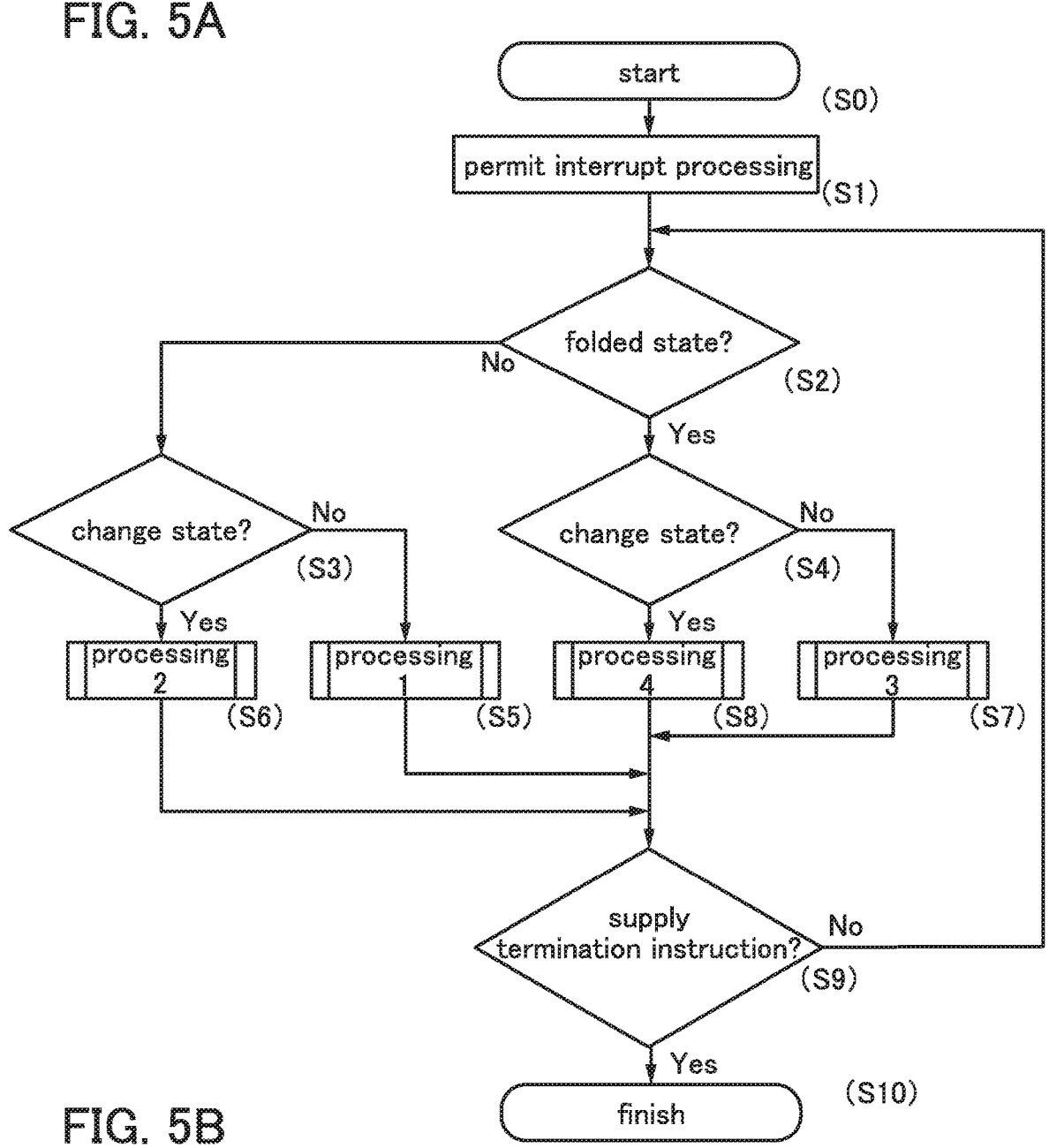
FIGS. 5A and 5B are flow charts illustrating the operation of a control portion in a display device of an embodiment.
Figure 5B:
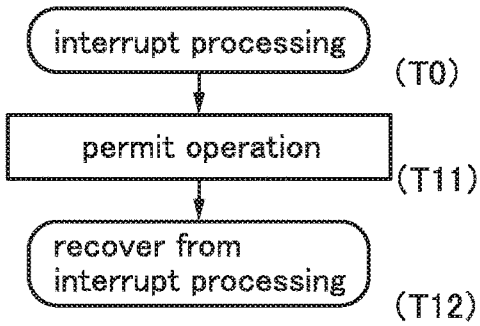

FIGS. 5A and 5B are flow charts illustrating the operation of a control portion of the display device of one embodiment of the present invention. FIG. 5A is a flow chart illustrating main processing, and FIG. 5B is a flow chart illustrating interrupt processing.

FIGS. 6A to 6D are flow charts illustrating processing 1, processing 2, processing 3, and processing 4 performed by the control portion of the display device of one embodiment of the present invention.

A display device 200B described in this embodiment includes the foldable display portion 230 including the first region 230(1) and the second region 230(2); the sensing portion 240 that senses an opened state or a folded state of the display portion 230 and supplies a fold signal F; a control portion 210B that receives the fold signal F and supplies an image control signal VC and a synchronization control signal SC; the image processing portion 220 that receives the image control signal VC and supplies a first image signal VIDEO(1) and a second image signal VIDEO(2); the synchronization signal supply portion 212 that receives the synchronization control signal SC and supplies a first synchronization signal SYNC(1) and a second synchronization signal SYNC(2); a first driver circuit 232(1) that receives the first image signal VIDEO(1) and the first synchronization signal SYNC(1) and drives the first region 230(1); and a second driver circuit 232(2) that receives the second image signal VIDEO(2) and the second synchronization signal SYNC(2) and drives the second region 230(2).

The control portion 210B supplies the image control signal VC that makes the image processing portion 220 generate an image in which a black image is displayed in the second region 230(2) of the display portion 230 in a folded state and the synchronization control signal SC that stops selection of a scan line in the second region 230(2) of the display portion 230 in a folded state.

The control portion 210B of the display device 200B described in this embodiment includes an arithmetic unit and a storage unit that stores a program to be executed by the arithmetic unit. The program includes the following steps.

In a first step, the interrupt processing is allowed (FIG. 5A (S1)).

In a second step, the operation proceeds to a third step when the display portion 230 is in an opened state and proceeds to a fourth step when the display portion 230 is in a folded state (FIG. 5A (S2)). Specifically, a fold signal F is acquired and is used to determine whether the display portion 230 is in an opened state or in a folded state.

In the third step, the operation proceeds to a fifth step in the case where the opened state of the display portion 230 has not changed, and proceeds to a sixth step in the case where the opened state of the display portion 230 has changed to the folded state (FIG. 5A (S3)). Note that a fold signal F that was acquired in the second step just prior to this step is compared with a fold signal F that was stored in the storage unit previously, whereby it is determined whether or not there has been a change in the state. In the case where the opened state of the display portion 230 has changed, a new fold signal F is stored to update the storage unit.

In the fourth step, the operation proceeds to a seventh step in the case where the folded state of the display portion 230 has not changed, and proceeds to an eighth step in the case where the folded state of the display portion 230 has changed to the opened state (FIG. 5A (S4)). Note that a fold signal F that was acquired in the second step just prior to this step is compared with a fold signal F that was stored in the storage unit previously, whereby it is determined whether or not there has been a change in the state. In the case where the folded state of the display portion 230 has changed, a new fold signal F is stored to update the storage unit.

In the fifth step, the processing 1 is executed (FIG. 5A (S5)).

In the sixth step, the processing 2 is executed (FIG. 5A (S6)).

In the seventh step, the processing 3 is executed (FIG. 5A (S7)).

In the eighth step, the processing 4 is executed (FIG. 5A (S8)).

In a ninth step, the operation proceeds to a tenth step when a termination instruction has been supplied in the interrupt processing and returns to the second step when the termination instruction has not been supplied in the interrupt processing (FIG. 5A (S9)).

In the tenth step, the program is terminated (FIG. 5A (S10)).

The interrupt processing includes an eleventh step of allowing operation and a twelfth step of recovering from the interrupt processing (FIG. 5B (T11) and (T12)).

The control portion 210B of the display device 200B described in this embodiment includes the storage unit that stores a program for execution of four types of processing. The program for execution of the four types of processing includes the following steps.

<<Processing 1>>

Figure 6A:
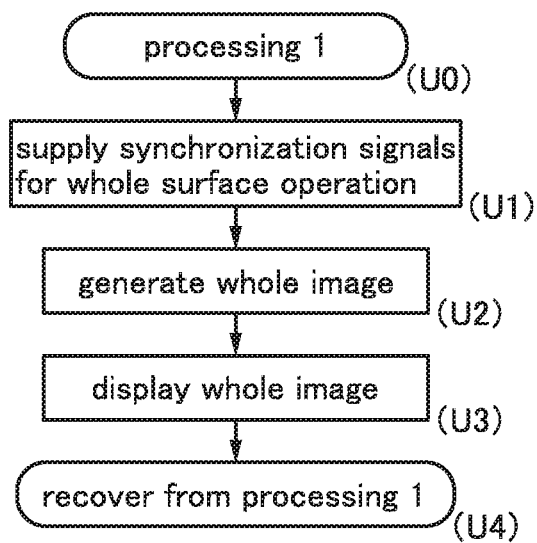
FIGS. 6A to 6D are flow charts each illustrating a processing performed by a control portion in a display device of an embodiment.

In a first step of the processing 1, the arithmetic unit makes the synchronization signal supply portion 212 supply a first synchronization signal SYNC(1) to the first driver circuits 232(1) and a second synchronization signal SYNC(2) to the second driver circuits 232(2) (FIG. 6A (U1)).

In a second step, the arithmetic unit makes the image processing portion 220 generate an image to be displayed in the first region 230(1) and the second region 230(2) (FIG. 6A (U2)).

In a third step, the arithmetic unit makes the display portion 230 display the image (FIG. 6A(U3)).

In a fourth step, the operation recovers from the processing 1 (FIG. 6A (U4)).

<<Processing 2>>

Figure 6B:
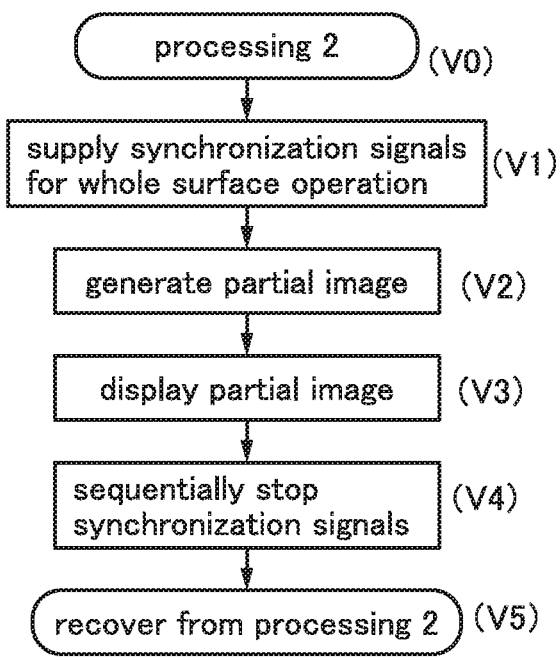

In a first step of the processing 2, the arithmetic unit makes the synchronization signal supply portion 212 supply a first synchronization signal SYNC(1) to the first driver circuits 232(1) and a second synchronization signal SYNC(2) to the second driver circuits 232(2) (FIG. 6B (V1)).

In a second step, the arithmetic unit makes the image processing portion 220 generate an image in which a black image is displayed in the second region 230(2) (FIG. 6B (V2)).

In a third step, the arithmetic unit makes the display portion 230 display the image (FIG. 6B (V3)).

In a fourth step, the arithmetic unit makes the synchronization signal supply portion 212 sequentially stop the supply of the second synchronization signals SYNC(2) to the second driver circuits 232(2) (FIG. 6B (V4)).

For example, the supply of synchronization signals is sequentially stopped in the following order: the potential of a start pulse signal is fixed at "Low", the potential of a clock signal is fixed at "Low", and then the power supply potential is fixed at "Low".

In a fifth step, the operation recovers from the processing 2 (FIG. 6B (V5)).

<<Processing 3>>

Figure 6C:
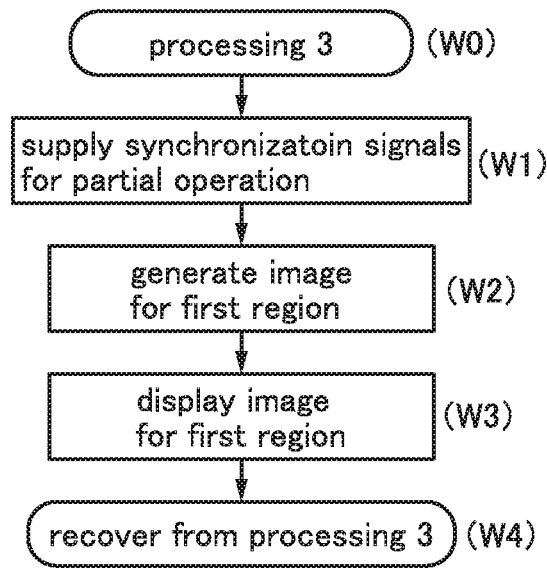

In a first step of the processing 3, the arithmetic unit makes the synchronization signal supply portion 212 supply a first synchronization signal SYNC(1) to the first driver circuits 232(1) (FIG. 6C (W1)).

In a second step, the arithmetic unit makes the image processing portion 220 generate an image to be displayed in the first region 230(1) (FIG. 6C (W2)).

In a third step, the arithmetic unit makes the display portion 230 display the image in the first region 230(1) (FIG. 6C (W3)).

In a fourth step, the operation recovers from the processing 3 (FIG. 6C (W4)).

<<Processing 4>>

Figure 6D:
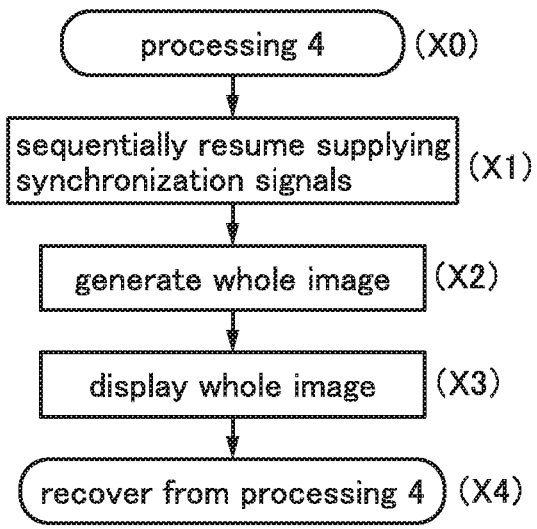

In a first step of the processing 4, the arithmetic unit makes the synchronization signal supply portion 212 sequentially resume the supply of the second synchronization signals SYNC(2) to the second driver circuits 232(2) (FIG. 6D (X1)).

For example, the supply of synchronization signals is sequentially resumed in the following order: a predetermined power supply potential is supplied, a clock signal is supplied, and then a start pulse signal is supplied.

In a second step, the arithmetic unit makes the image processing portion 220 generate an image to be displayed in the first region 230(1) and the second region 230(2) (FIG. 6D (X2)).

In a third step, the arithmetic unit makes the display portion 230 display the image (FIG. 6D (X3)).

In a fourth step, the operation recovers from the processing 4 (FIG. 6D (X4)).

The above display device 200B of one embodiment of the present invention includes the display portion 230 that can be opened and folded, the sensing portion 240 that senses a folded state of the display portion 230, the image processing portion 220 that generates, when the display portion 230 is in the folded state, an image in which a black image is displayed in part of the display portion 230, and the synchronization signal supply portion 212 that can stop the supply of a second synchronization signal SYNC(2) used for a portion where a black image is to be displayed. Thus, the display in a region where display is unnecessary when part of the display portion is folded can be stopped. Consequently, a display device with low power consumption can be provided. Furthermore, a display device in which an image is displayed in a region that can be used in a folded state can be provided.

Elements included in the display device 200B of one embodiment of the present invention are described below. For elements that can be similar to those in the display device 200 described in Embodiment 1, the description in Embodiment 1 can be referred to.

<<Foldable Display Portion>>

The display portion 230 that can be used in the display device 200B can be similar to the display portion 230 described in Embodiment 1 except that the first region 230(1) is driven by the first driver circuits 232(1) and the second region 230(2) is driven by the second driver circuits 232(2).

Figure 16:
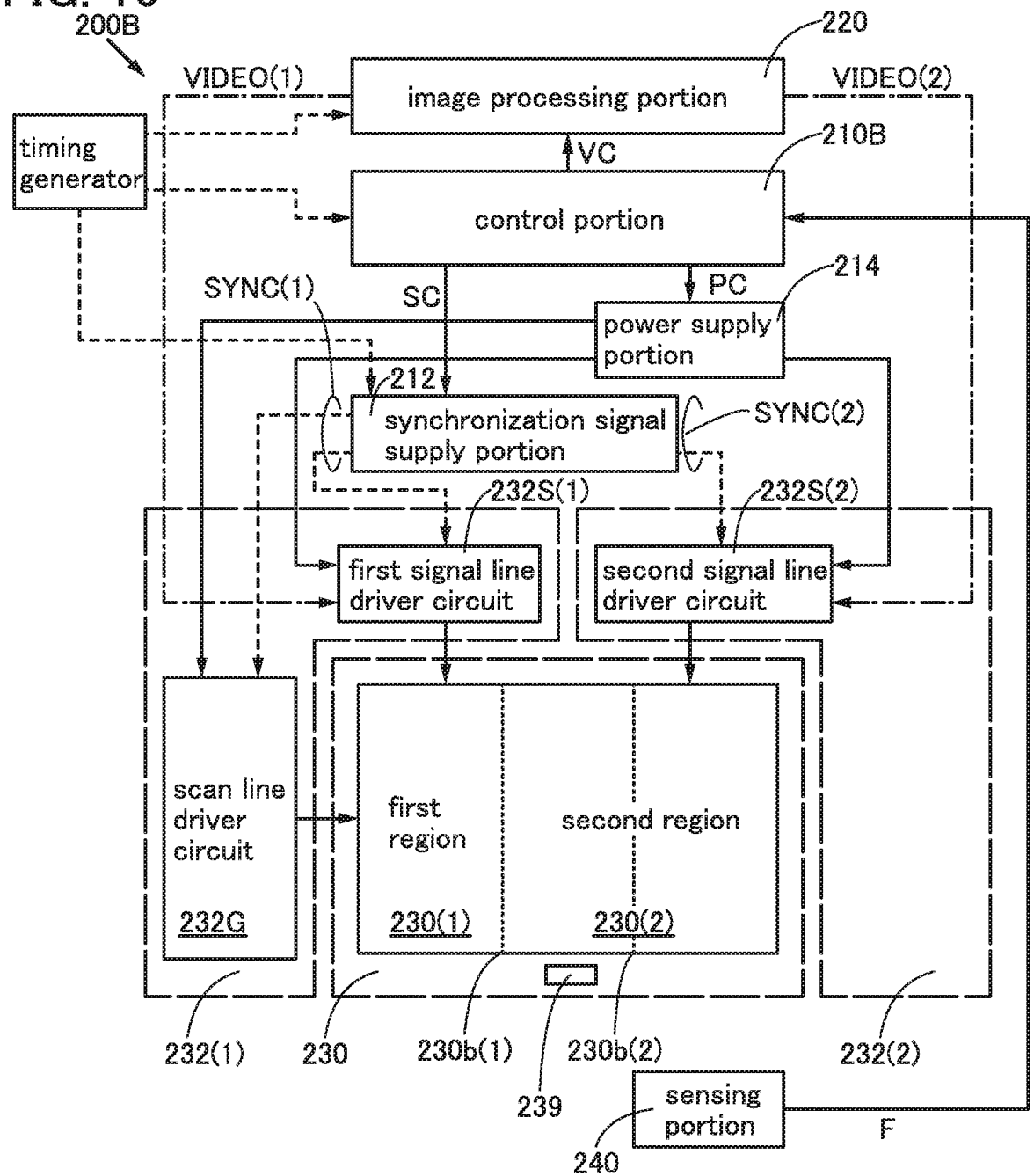
FIG. 16 is a block diagram illustrating a structure of a display device of an embodiment.
Figure 17:
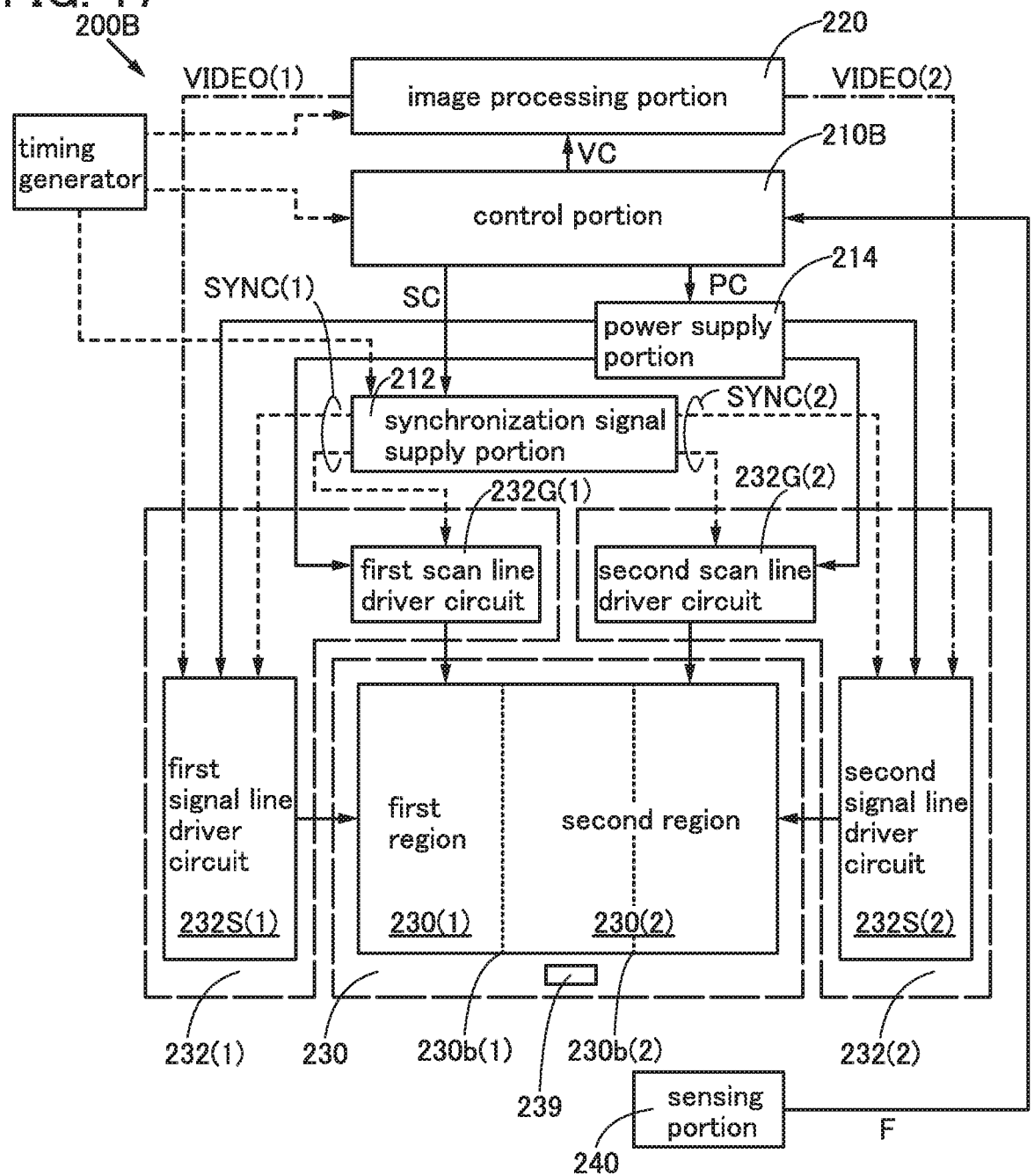
FIG. 17 is a block diagram illustrating a structure of a display device of an embodiment.

Scan lines provided in the first region 230(1) and scan lines provided in the second region 230(2) are electrically insulated from each other at the boundary 230b(1) between the first region 230(1) and the second region 230(2). Note that in the case where the scan line driver circuit 232G is placed on only one side as shown in FIG. 16, the scan lines in the first region 230(1) and the scan lines in the second region 230(2) may be connected to each other. In that case, since the scan lines in the second region 230(2) are also selected when the scan lines in the first region 230(1) are selected, if black display is to be performed in the second region 230(2), signals for black display need to be supplied from the signal line driver circuit 232S(2). However, since keeping black display requires only supply of a constant voltage, power consumption can be reduced.

<<Driver Circuit>>

The display device 200B includes the first driver circuits 232(1) and the second driver circuits 232(2).

The first driver circuits 232(1) include a scan line driver circuit 232G(1) and a signal line driver circuit 232S(1).

The second driver circuits 232(2) include a scan line driver circuit 232G(2) and a signal line driver circuit 232S(2).

Figure 18:
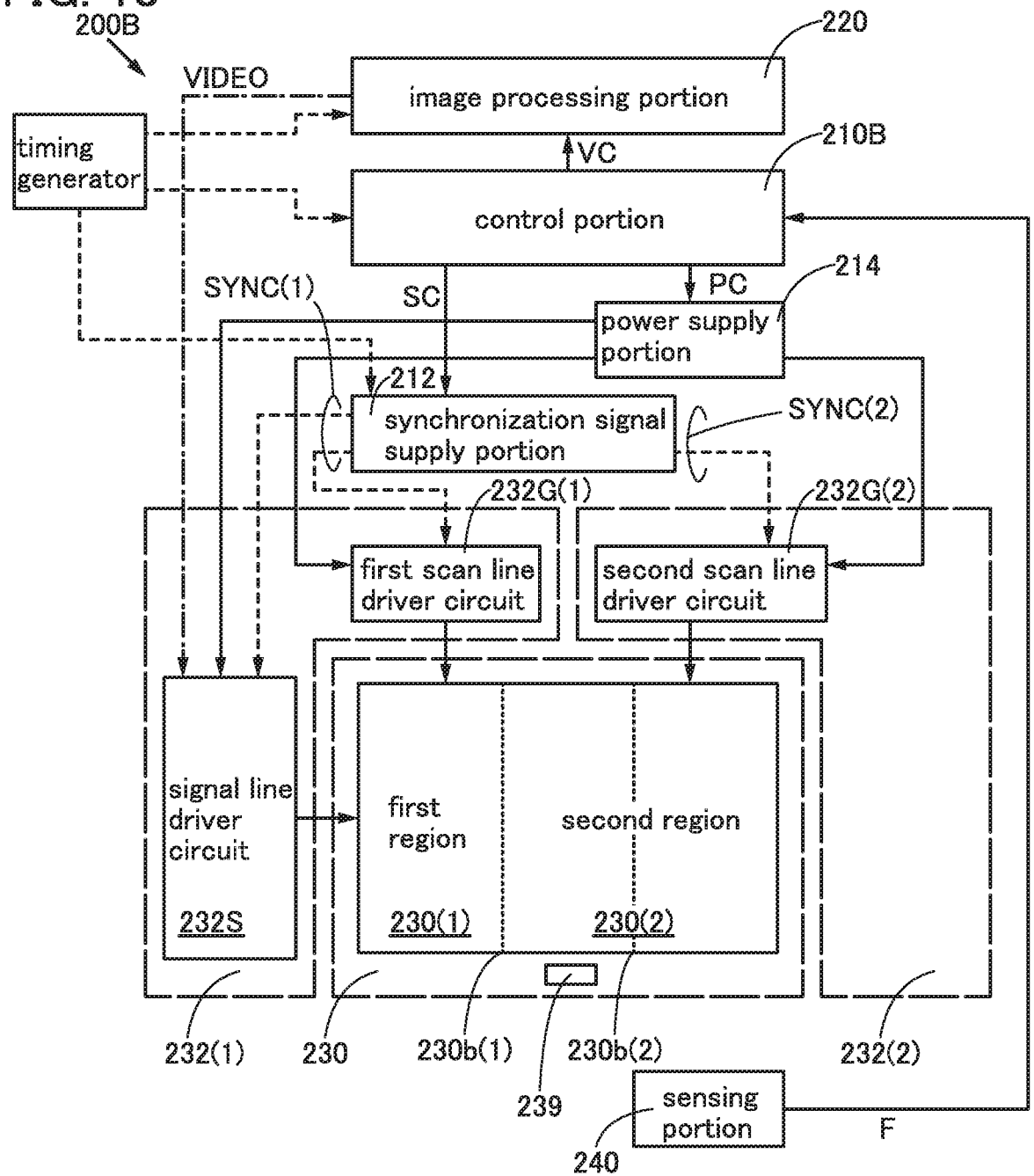
FIG. 18 is a block diagram illustrating a structure of a display device of an embodiment.

Like FIG. 14 and FIGS. 15A and 15B, FIG. 17 illustrates the case where the scan line driver circuits and the signal line driver circuits in FIG. 4 are replaced with each other. In this case, signal lines provided in the first region 230(1) and signal lines provided in the second region 230(2) are electrically insulated from each other at the boundary 230b(1) between the first region 230(1) and the second region 230(2). Note that in the case where the signal line driver circuit 232S is placed on only one side as shown in FIG. 18, the signal lines in the first region 230(1) and the signal lines in the second region 230(2) may be connected to each other. In that case, since image signals are supplied also to the signal lines in the second region 230(2) when image signals are supplied to the signal lines in the first region 230(1), if black display is to be performed in the second region 230(2), signals for not selecting pixels need to be supplied from the scan line driver circuit 232G(2). However, since keeping a non-selection state requires only supply of a constant voltage, power consumption can be reduced.

The scan line driver circuit 232G(1) receives power supply potential and a first synchronization signal SYNC(1) and supplies scan line selection signals to scan lines provided in the first region 230(1).

The scan line driver circuit 232G(2) receives power supply potential and a second synchronization signal SYNC(2) and supplies scan line selection signals to scan lines provided in the second region 230(2).

The signal line driver circuit 232S(1) receives power supply potential, a first synchronization signal SYNC(1), and a first image signal VIDEO(1) and supplies an image signal.

The signal line driver circuit 232S(2) receives power supply potential, a second synchronization signal SYNC(2), and a second image signal VIDEO(2) and supplies an image signal.

A scan line selection signal is supplied to the first region 230(1) of the display portion 230, whereby one scan line and pixels connected to the scan line are selected. In addition, a scan line selection signal is supplied to the second region 230(2) of the display portion 230, whereby one scan line and pixels connected to the scan line are selected.

Image signals are supplied to pixels to which a scan line selection signal is supplied, and pixel circuits in the pixels store the image signals. In addition, display elements in the pixels perform display in accordance with the image signals.

<<Synchronization Signal Supply Portion>>

The synchronization signal supply portion 212 receives a synchronization control signal SC and supplies a first synchronization signal SYNC(1) and a second synchronization signal SYNC(2).

The first synchronization signal SYNC(1) is used for synchronous operation of the first driver circuits 232(1). The second synchronization signal SYNC(2) is used for synchronous operation of the second driver circuits 232(2). Examples of the synchronization signal include a vertical synchronization signal and a horizontal synchronization signal, a start pulse signal SP, a latch signal LP, a pulse width control signal PWC, and a clock signal CLK.

The synchronization signal supply portion 212 supplies the second synchronization signal SYNC(2) or stops the supply in accordance with the supplied synchronization control signal SC. By stopping the supply of the second synchronization signal SYNC(2), the operation of the second region 230(2) can be stopped. Note that "operation is stopped" refers to the case where wirings in the portion are in a high-impedance state (or floating state) or to the case where a predetermined potential is supplied to the wirings and the potential remains constant so that the portion is kept in the same state.

<<Image Processing Portion>>

The image processing portion 220 receives an image control signal VC, generates an image, and supplies a first image signal VIDEO(1) and a second image signal VIDEO(2) of the generated image.

The first image signal VIDEO(1) includes data on an image to be displayed in the first region 230(1) of the display portion 230. The second image signal VIDEO(2) includes data on an image to be displayed in the second region 230(2) of the display portion 230.

For example, the image processing portion 220 can generate, in accordance with the image control signal VC, one image to be displayed in the first region 230(1) and the second region 230(2).

Moreover, the image processing portion 220 can generate, in accordance with the image control signal VC, one image in which a black image, for example, is displayed in the second region 230(2).

Furthermore, in accordance with the image control signal VC, the image processing portion 220 can generate only one image to be displayed in the first region 230(1).

Accordingly, the power consumption of the display device 200B can be reduced.

Specifically, power consumed by the second region 230(2) that is folded so that display cannot be seen can be reduced.

A light-emitting element is an example of a display element that consumes less power when displaying a black image than when displaying other images.

<<Sensing Portion and Sign>>

The sensing portion 240 senses an opened state or a folded state of the display portion 230 and supplies a fold signal F. Note that structures similar to those in Embodiment 1 can be used for the sensing portion and the sign.

<<Control Portion>>

The control portion 210B can receive a fold signal F and supply an image control signal VC, a synchronization control signal SC, and a power supply control signal PC.

The image control signal VC is a signal for controlling the image processing portion 220. Examples of the image control signal VC include a signal that makes the image processing portion 220 generate different images in accordance with the opened state or the folded state of the display portion 230.

<<Timing Generator>>

A timing generator generates and supplies a reference clock signal or the like that the display device 200B needs.

<<Power Supply Portion>>

The power supply portion 214 receives a power supply control signal PC and supplies power supply potential.

The power supply portion 214 supplies power supply potential or stops the supply in accordance with the supplied power supply control signal PC. By stopping the supply of the power supply potential to the second driver circuits 232(2), power consumed by the second driver circuits 232(2) can be reduced.

Note that "supply of power supply potential is stopped" sometimes refers to the following case: impedance to at least one of a high power supply potential (e.g., VDD) and a low power supply potential (e.g., VSS or GND) is made high so that energy is not supplied, and energy of the other power supply potential is supplied. In that case, only the other power supply potential is supplied from the driver circuit. As a result, a predetermined potential is supplied to wirings in the portion connected to the driver circuit and the potential remains constant so that the portion is kept in the same state.

For example, in the case where only a non-selection signal is to be supplied from the scan line driver circuit 232G(2), only a power supply potential corresponding to the potential of the non-selection signal is supplied to the scan line driver circuit 232G(2) from the power supply portion 214. Consequently, current hardly flows in the scan line driver circuit 232G(2); thus, power consumption can be reduced. Alternatively, in the case where only a potential needed for black display is to be supplied from the signal line driver circuit 232S(2), only a power supply potential corresponding to the potential needed for black display is supplied to the signal line driver circuit 232S(2) from the power supply portion 214. Consequently, current hardly flows in the signal line driver circuit 232S(2); thus, power consumption can be reduced.

Furthermore, "supply of power supply potential is stopped" sometimes refers to the following case: impedance to both a high power supply potential (e.g., VDD) and a low power supply potential (e.g., VSS or GND) is made high so that energy is not supplied. In that case, energy is not supplied from the driver circuit. As a result, wirings in the portion connected to the driver circuit are put in a high-impedance state (or floating state). Thus, in the case where black display has been performed, the black display state is maintained, so that power consumption can be reduced. In addition, since current does not flow in the driver circuit, power consumption can be reduced.

Note that the power supply portion 214 may include a plurality of power supplies, specifically a first power supply and a second power supply.

A modification example of the display device 200B described in this embodiment includes a first power supply that supplies power supply potential to the first driver circuit 232(1) and a second power supply that supplies power supply potential to the second driver circuit 232(2). The control portion 210B supplies a power supply control signal PC to the second power supply in accordance with the fold signal F. The second power supply stops supply of power supply potential in accordance with the power supply control signal PC.

The above display device of one embodiment of the present invention includes a display portion that can be opened and folded, a synchronization signal supply portion that can stop the supply of a synchronization signal used for a portion where a black image is to be displayed, and a power supply that can stop the supply of a power supply potential used for a portion where a black image is to be displayed. Thus, the display in a region where display is unnecessary when part of the display portion is folded can be stopped. Consequently, a display device with low power consumption can be provided. Furthermore, a display device in which an image is displayed in a region that can be used in a folded state can be provided.

Modification Example

A display device 200D described as a modification example in this embodiment will be described with reference to FIG. 4; the display device 200B in FIG. 4 is replaced with the display device 200D.

In the display device 200D described as a modification example in this embodiment, the frequency of rewriting images in the display portion can be varied.

Specifically, description is given on a display device which has a first mode in which a scan line selection signal for selecting a pixel is output at a frequency of more than or equal to 30 Hz (30 times per second), preferably more than or equal to 60 Hz (60 times per second) and less than 960 Hz (960 times per second) and a second mode in which the scan line selection signal is output at a frequency of more than or equal to 11.6 µHz (once per day) and less than 0.1 Hz (0.1 times per second), preferably more than or equal to 0.28 mHz (once per hour) and less than 1 Hz (once per second).

When a still image is displayed with the display device 200D described as a modification example in this embodiment, the refresh rate can be set to less than 1 Hz, preferably less than or equal to 0.2 Hz. This enables display with reduced eye strain on a user. Further, a display image can be refreshed at an optimal frequency in accordance with the quality of the image displayed on the display portion. Specifically, in displaying a still image, the refresh rate can be set lower than that in displaying a smooth moving image; thus, a still image with less flicker can be displayed. In addition, power consumption can be reduced.

Note that the display device 200D described as a modification example in this embodiment has the same structure as the display device 200B except for the structures of the control portion, the driver circuits, and the display portion.

<<Driver Circuit>>

The scan line driver circuit 232G(1) and the scan line driver circuit 232G(2) each supply scan line selection signals at different frequencies in accordance with the supplied first synchronization signal SYNC(1) and second synchronization signal SYNC(2).

For example, the driver circuit supplies scan line selection signals in the following modes: a first mode of outputting a scan line selection signal at a frequency of more than or equal to 30 Hz (30 times per second), preferably more than or equal to 60 Hz (60 times per second) and less than 960 Hz (960 times per second) and a second mode of outputting a scan line selection signal at a frequency of more than or equal to 11.6 µHz (once per day) and less than 0.1 Hz (0.1 times per second), preferably more than or equal to 0.28 mHz (once per hour) and less than 1 Hz (once per second).

<<Synchronization Signal Supply Portion>>

The synchronization signal supply portion 212 supplies, in accordance with the supplied synchronization control signal SC, a first synchronization signal SYNC(1) and a second synchronization signal SYNC(2) that make the driver circuits each supply scan line selection signals at different frequencies.

For example, the synchronization signal supply portion 212 controls the output frequency of a start pulse signal supplied to the scan line driver circuit, whereby scan line selection signals can be supplied at different frequencies.

<<Control Portion>>

A control portion 210D supplies a synchronization control signal SC to the synchronization signal supply portion 212 and makes the driver circuit supply scan line selection signals at different frequencies. For example, when a moving image is displayed, the control portion 210D supplies a synchronization control signal SC for supplying scan line selection signals at a high frequency, and when a still image is displayed, the control portion 210D supplies a synchronization control signal SC for supplying scan line selection signals at a low frequency.

<<Transistor>>

The second transistor 634t_2 supplies a current corresponding to the potential of the signal line S to control the light emission of the EL element 635EL.

As an example of a transistor that can be suitably used as the first transistor 634t_1 or the second transistor 634t_2, a transistor including an oxide semiconductor can be given.

A transistor including an oxide semiconductor film can have leakage current between a source and a drain in an off state (off-state current) much lower than that of a conventional transistor including silicon.

When a transistor with extremely low off-state current is used in a pixel portion of a display portion, frame frequency can be lowered while flicker is reduced.

Furthermore, in the processing 2 in this embodiment, pixels in the second region 230(2) in each of which a transistor with extremely low off-state current including an oxide semiconductor is used can hold image signals for a black image supplied to the second region 230(2) for a long time, as compared to the case where a transistor including silicon is used. Thus, the display in a region where display becomes unnecessary can be stopped. Consequently, a display device with low power consumption can be provided. Furthermore, a display device in which an image is displayed in a region that can be used in a folded state can be provided.

An example of a structure of the transistor that can be suitably used as the first transistor 634t_1 or the second transistor 634t_2 is described in Embodiment 4.

This embodiment can be combined with any of the other embodiments in this specification as appropriate.

Embodiment 3

In this embodiment, a structure of a display device 200C of one embodiment of the present invention is described with reference to FIGS. 7A to 7C, FIGS. 8A to 8D, and FIGS. 9A and 9B.

Figure 7A:
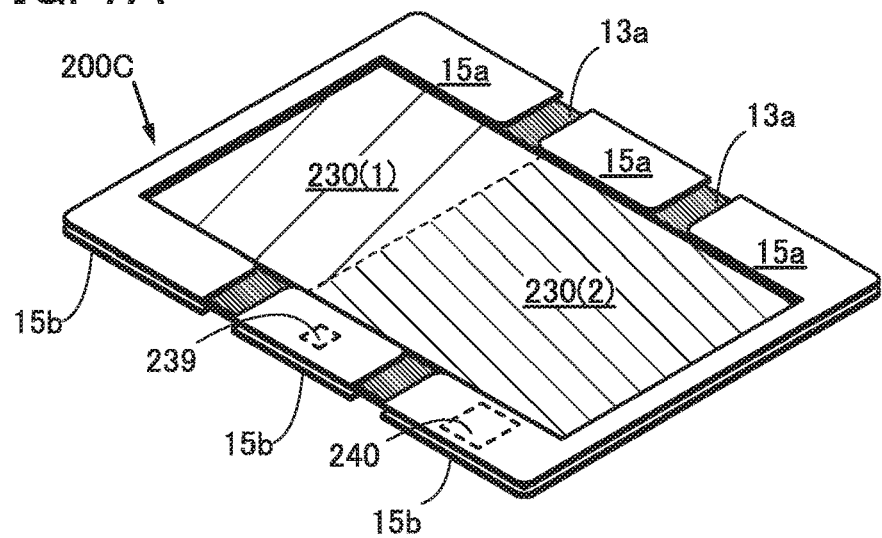
FIGS. 7A to 7C are external views illustrating a structure of a display device of an embodiment.
Figure 7B:
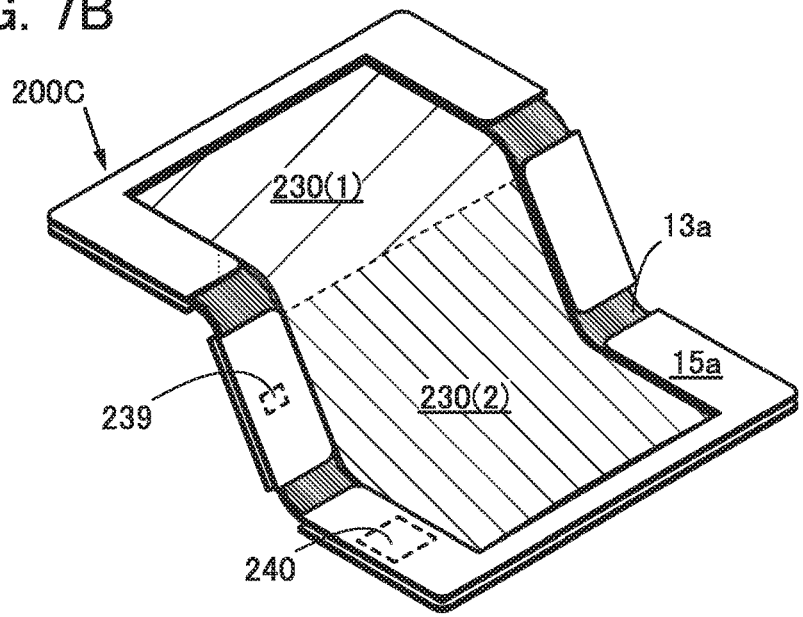
Figure 7C:
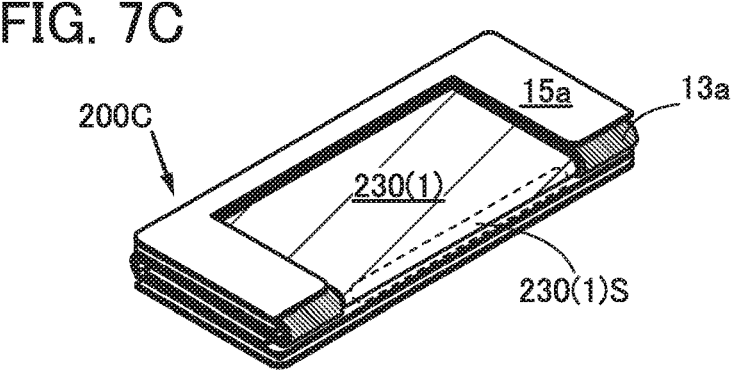

FIGS. 7A to 7C are perspective views illustrating the structure of the display device 200C of one embodiment of the present invention. FIG. 7A illustrates the display device 200C in an opened state. FIG. 7B illustrates the display device 200C in a bent state, and FIG. 7C illustrates the display device 200C in a folded state.

Figure 8A:
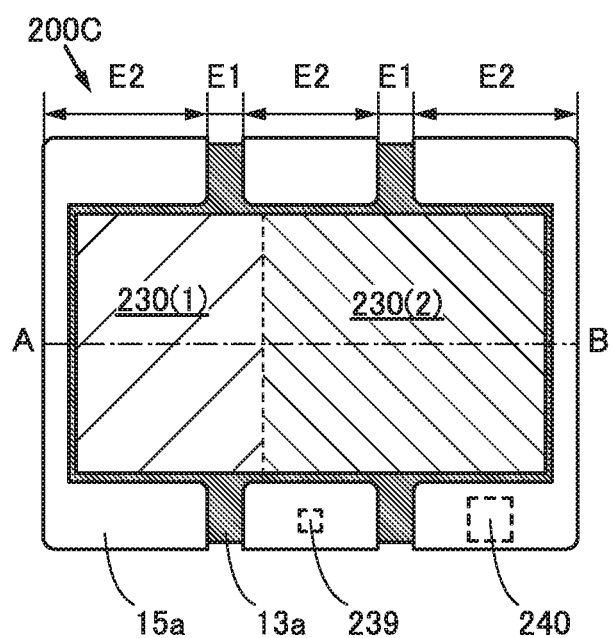
FIGS. 8A to 8D illustrate a structure of a display device of an embodiment.
Figure 8B:
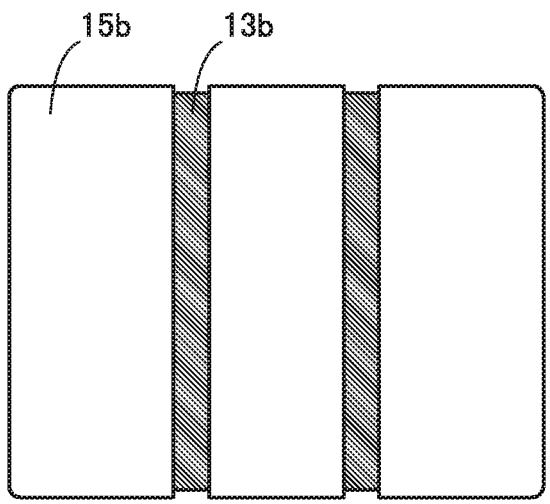
Figure 8C:
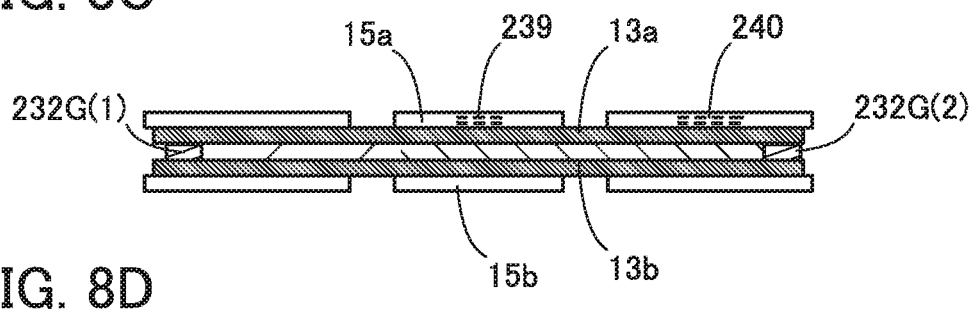
Figure 8D:
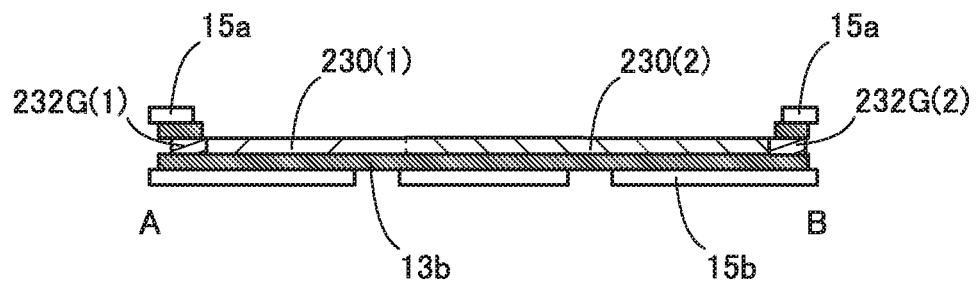

FIGS. 8A to 8D illustrate the structure of the display device 200C of one embodiment of the present invention. FIG. 8A is a top view of the display device 200C that is opened, and FIG. 8B is a bottom view of the display device 200C that is opened. FIG. 8C is a side view of the display device 200C that is opened, and FIG. 8D is a cross-sectional view taken along dashed-dotted line A-B in FIG. 8A.

Figure 9A:
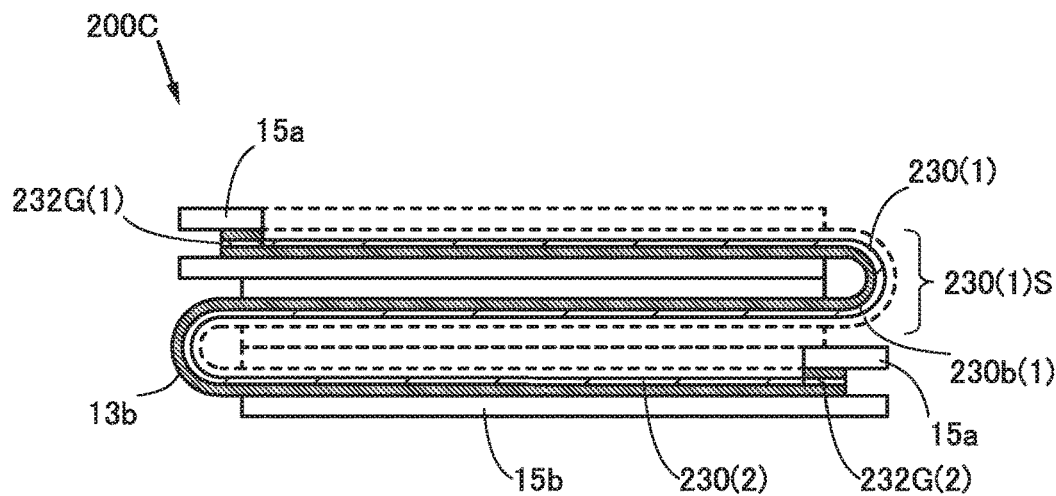
FIGS. 9A and 9B illustrate a structure of a display panel that can be used for a display device of an embodiment.
Figure 9B:
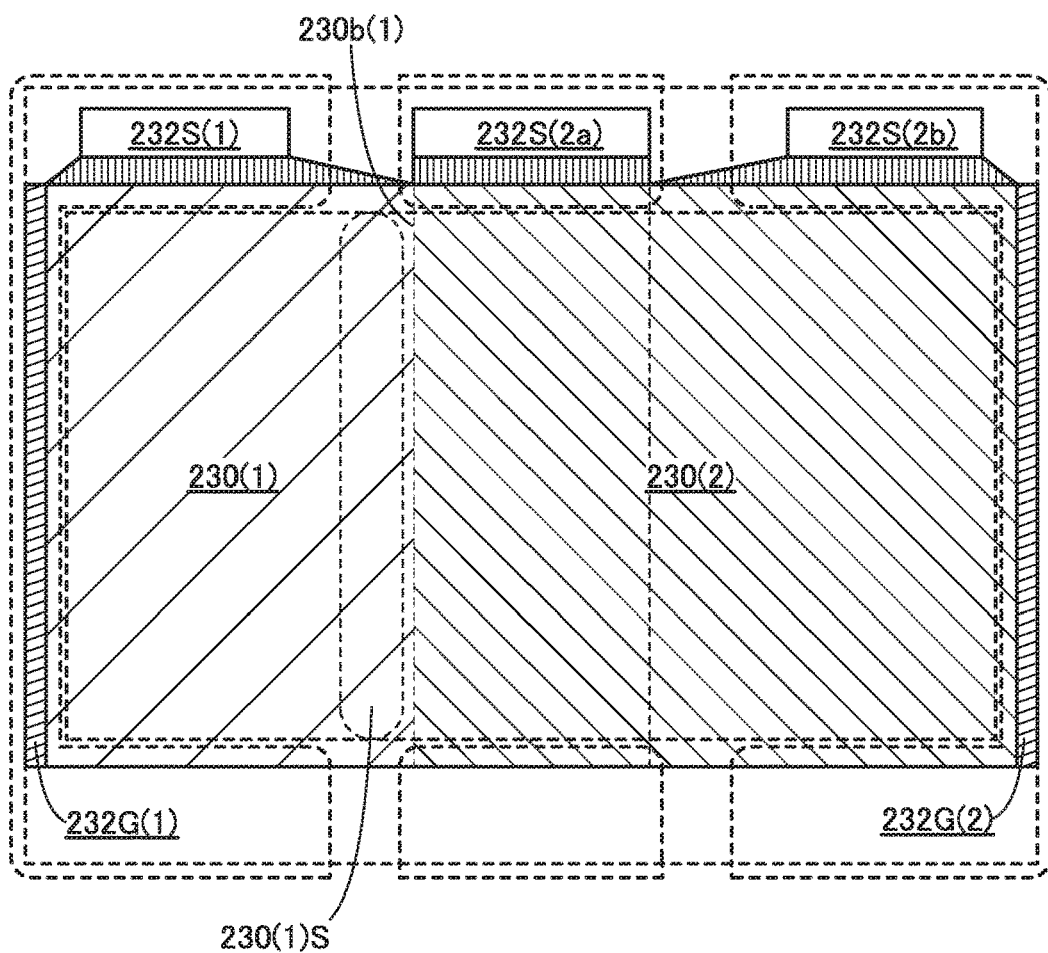

FIGS. 9A and 9B illustrate the structure of a display panel of the display device 200C of one embodiment of the present invention. FIG. 9A is a cross-sectional view of the center of the display device 200C in a folded state, and FIG. 9B is a top view of the display panel in an opened state.

The display device 200C described in this embodiment includes a foldable display portion including the first region 230(1) and the second region 230(2); driver circuits that drive the display portion; an image processing portion that supplies an image signal to the driver circuits; the sensing portion 240 that senses an opened state or a folded state of the display portion and supplies a fold signal; and a control portion that receives the fold signal (FIG. 7A).

The control portion supplies an image control signal in accordance with the fold signal, and the image processing portion generates, in accordance with the image control signal, an image in which a black image is displayed in the second region 230(2).

Note that the driver circuits, the image processing portion, and the control portion are provided between support panels 15a and support panels 15b.

The display device 200C includes a strip-like high flexibility region E1 and a strip-like low flexibility region E2 that are arranged alternately, in other words, form stripes (FIG. 8A). Note that the regions are not necessarily arranged in parallel to each other.

A connecting member 13a is partly exposed between two support panels 15a apart from each other. In addition, a connecting member 13b is partly exposed between two support panels 15b apart from each other (FIGS. 8A and 8B).

The display device 200C can be folded by bending the high flexibility region E1 (see FIGS. 7B and 7C).

<<High Flexibility Region>>

The high flexibility region E1 serves as a hinge. The high flexibility region E1 includes at least a flexible display panel.

The high flexibility region E1 includes the connecting member 13a on the image display side of the display panel and the connecting member 13b on the opposite side (see FIGS. 8A and 8B). The display panel is held between the connecting member 13a and the connecting member 13b (see FIG. 7A and FIGS. 8C and 8D).

<<Low Flexibility Region>>

The low flexibility region E2 includes the support panel 15a on the image display side of the display panel and the support panel 15b on the opposite side. The display panel is held between the support panel 15a and the support panel 15b.

A stacked body in which the support panel 15a and the support panel 15b overlap with each other has a lower flexibility than that of the display panel.

The support panels 15a and the support panels 15b support the display panel to increase its mechanical strength and can prevent breakage of the display panel.

The scan line driver circuit 232G(1), the scan line driver circuit 232G(2), and the signal line driver circuit 232S(1) are held between the support panels 15a and the support panels 15b. Thus, the driver circuits can be protected from external stress (see FIGS. 9A and 9B).

Note that the support panels may be placed on only one of the display surface side and the side opposite to the display surface side of the display panel. For example, a display device that includes the plurality of support panels 15b and does not include the plurality of support panels 15a may be employed. Thus, the display device can be made thin and/or lightweight.

<<Connecting Member and Support Panel>>

For the connecting member 13a, the connecting member 13b, the support panels 15a, and the support panels 15b, for example, plastic, a metal, an alloy, and/or rubber can be used.

Plastic, rubber, or the like is preferably used because it can form a connecting member or a support panel that is lightweight and less likely to be broken. For example, silicone rubber may be used for the connecting member and stainless steel or aluminum may be used for the support panel.

In the case where a connecting member or a support panel is placed on the display surface side of the display panel, a light-transmitting material is used for a portion that overlaps with a region where display is performed on the display panel, i.e., the first region 230(1) and the second region 230(2).

To fix two of the connecting member, the support panel, and the display panel, for example, an adhesive, a screw or pin that penetrates them, or a clip that holds them can be used.

<<Sensing Portion and Sign>>

The sign 239 and the sensing portion 240 are provided on the support panels 15a to sense an opened state or a folded state of the display portion 230 (see FIGS. 7A and 7B and FIGS. 8A and 8C).

When the display portion 230 is in an opened state, the sign 239 is away from the sensing portion 240 (see FIG. 7A).

When the display portion 230 is bent at the connecting member 13a, the sign 239 gets close to the sensing portion 240 (see FIG. 7B).

When the display portion 230 is folded at the connecting member 13a, the sign 239 faces the sensing portion 240 (see FIG. 7C). The sensing portion 240 senses the sign 239 facing it, recognizes a folded state, and supplies a fold signal F indicating a folded state.

<<Display Panel>>

The display panel includes the display portion, first driver circuits, and second driver circuits (see FIGS. 9A and 9B).

The display portion includes the first region 230(1) and the second region 230(2).

The first driver circuits include the scan line driver circuit 232G(1) and the signal line driver circuit 232S(1). The second driver circuits include the scan line driver circuit 232G(2), a signal line driver circuit 232S(2a), and a signal line driver circuit 232S(2b).

The first driver circuits drive the first region 230(1). The second driver circuits drive the second region 230(2). The signal line driver circuit 232S(2a) and the signal line driver circuit 232S(2b) supply image signals to pixels to which the scan line driver circuit 232G(2) supplies a selection signal.

There is the boundary 230b(1) between the first region 230(1) and the second region 230(2). In addition, there is a region 230(1)S that is close to the boundary 230b(1) and is in the first region 230(1) (see FIG. 9B). The region 230(1)S is on a side surface of the display device 200C in a folded state (see FIG. 9A).

The first region 230(1) includes the region 230(1)S. Even when driving of the second region 230(2) of the display device 200C is stopped in a folded state, an image can be displayed in the region 230(1)S by driving the first region 230(1). In this manner, an image can be displayed on the side surface of the display device 200C; thus, the side surface can be effectively utilized.

Structures of the flexible display panel are described in Embodiments 6 and 7.

The display device 200C in a folded state is highly portable. It is possible to fold the display device 200C such that the first region 230(1) of the display portion is on the outer side and use only the first region 230(1) for display (see FIG. 7C). For example, when the display portion is provided with a touch panel and has a size such that it can be supported with one hand in a folded state, the touch panel can be operated with the thumb of the hand supporting it. Thus, a display device that can be operated with one hand in a folded state can be provided.

When the second region 230(2) that is hidden from a user in a folded state is not driven in a folded state, the power consumption of the display device 200C can be reduced. Moreover, folding the display device 200C such that the second region 230(2) is on the inner side can prevent damage and attachment of dirt to the second region 230(2).

The display device 200C can display an image on a seamless large region in an opened state. Thus, highly browsable display is possible.

This embodiment can be combined with any of the other embodiments in this specification as appropriate.

Embodiment 4

In this embodiment, a structure of a transistor 151 that can be used in a display device of one embodiment of the present invention is described with reference to FIGS. 10A to 10C.

Figure 10A:
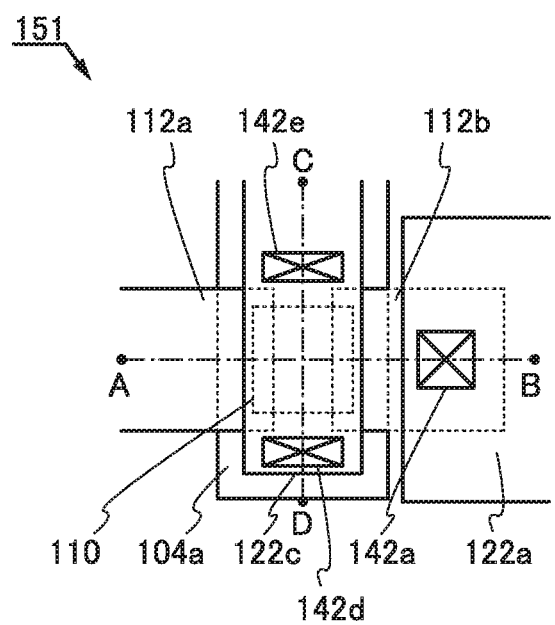
FIGS. 10A to 10C illustrate a structure of a transistor that can be used in a display device of an embodiment.
Figure 10C:
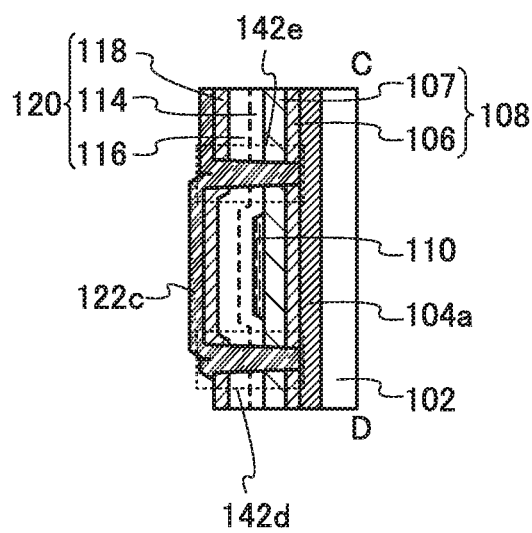
Figure 10B:
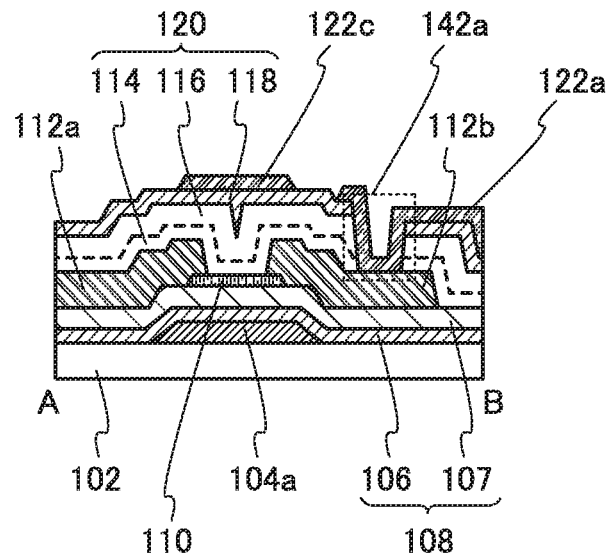

FIGS. 10A to 10C are a top view and cross-sectional views of the transistor 151. FIG. 10A is a top view of the transistor 151, FIG. 10B is a cross-sectional view taken along dashed-dotted line A-B in FIG. 10A, and FIG. 10C is a cross-sectional view taken along dashed-dotted line C-D in FIG. 10A. Note that in FIG. 10A, some components are not illustrated for clarity.

Note that in this embodiment, the first electrode refers to one of a source and a drain of a transistor, and the second electrode refers to the other.

The transistor 151 is a channel-etched transistor and includes a gate electrode 104a provided over a substrate 102, a first insulating film 108 that includes insulating films 106 and 107 and is formed over the substrate 102 and the gate electrode 104a, an oxide semiconductor film 110 overlapping with the gate electrode 104a with the first insulating film 108 provided therebetween, and a first electrode 112a and a second electrode 112b in contact with the oxide semiconductor film 110. In addition, over the first insulating film 108, the oxide semiconductor film 110, the first electrode 112a, and the second electrode 112b, a second insulating film 120 including insulating films 114, 116, and 118 and a gate electrode 122c formed over the second insulating film 120 are provided. The gate electrode 122c is connected to the gate electrode 104a in openings 142d and 142e provided in the first insulating film 108 and the second insulating film 120. In addition, a conductive film 122a serving as a pixel electrode is formed over the insulating film 118. The conductive film 122a is connected to the second electrode 112b through an opening 142a provided in the second insulating film 120.

Note that the first insulating film 108 serves as a first gate insulating film of the transistor 151, and the second insulating film 120 serves as a second gate insulating film of the transistor 151. Furthermore, the conductive film 122a serves as a pixel electrode.

In the channel width direction of the transistor 151 of one embodiment of the present invention, the oxide semiconductor film 110 is provided between the gate electrode 104a and the gate electrode 122c with the first insulating film 108 provided between the gate electrode 104a and the oxide semiconductor film 110 and with the second insulating film 120 provided between the gate electrode 122c and the oxide semiconductor film 110. In addition, as illustrated in FIG. 10A, the gate electrode 104a overlaps with side surfaces of the oxide semiconductor film 110 with the first insulating film 108 provided therebetween, when seen from the above.

A plurality of openings is provided in the first insulating film 108 and the second insulating film 120. Typically, as illustrated in FIG. 10B, the opening 142a through which part of the second electrode 112b is exposed is provided. Furthermore, in the channel width direction, the openings 142d and 142e are provided with the oxide semiconductor film 110 provided therebetween as illustrated in FIG. 10C. In other words, the openings 142d and 142e are provided on outer sides of the side surfaces of the oxide semiconductor film 110.

In the opening 142a, the second electrode 112b is connected to the conductive film 122a.

In addition, in the openings 142d and 142e, the gate electrode 104a is connected to the gate electrode 122c. This means that the gate electrode 104a and the gate electrode 122c surround the oxide semiconductor film 110 in the channel width direction with the first insulating film 108 and the second insulating film 120 provided between the oxide semiconductor film 110 and each of the gate electrode 104a and the gate electrode 122c. Furthermore, the gate electrode 122c on the side surfaces of the openings 142d and 142e faces the side surfaces of the oxide semiconductor film 110.

The gate electrode 104a and the gate electrode 122c are included, the same potential is applied to the gate electrode 104a and the gate electrode 122c, the side surface of the oxide semiconductor film 110 faces the gate electrode 122c, and the gate electrode 104a and the gate electrode 122c surround the oxide semiconductor film 110 in the channel width direction with the first insulating film 108 and the second insulating film 120 provided between the oxide semiconductor film 110 and each of the gate electrode 104a and the gate electrode 122c; thus, carriers flow not only at the interfaces between the oxide semiconductor film 110 and each of the first insulating film 108 and the second insulating film 120 but also in a wide region in the oxide semiconductor film 110, which results in an increase in the amount of carriers that move in the transistor 151.

As a result, the on-state current of the transistor 151 is increased, and the field-effect mobility is increased to greater than or equal to 10 cm$^2$/V·s or to greater than or equal to 20 cm$^2$/V·s, for example. Note that here, the field-effect mobility is not an approximate value of the mobility as the physical property of the oxide semiconductor film but is the apparent field-effect mobility in a saturation region of the transistor, which is an indicator of current drive capability. Note that an increase in field-effect mobility becomes significant when the channel length (also referred to as L length) of the transistor is longer than or equal to 0.5 μm and shorter than or equal to 6.5 μm, preferably longer than 1 μm and shorter than 6 μm, further preferably longer than 1 μm and shorter than or equal to 4 μm, still further preferably longer than 1 μm and shorter than or equal to 3.5 μm, yet still further preferably longer than 1 μm and shorter than or equal to 2.5 μm. Furthermore, with a short channel length longer than or equal to 0.5 μm and shorter than or equal to 6.5 μm, the channel width can also be short.

Thus, even if a plurality of regions to be connection portions between the gate electrode 104a and the gate electrode 122c is provided, the area of the transistor 151 can be reduced.

Defects are formed at the end portion of the oxide semiconductor film 110, which is processed by etching or the like, because of damage due to the processing, and the end portion is polluted by attachment of impurities or the like. For this reason, in the case where only one of the gate electrode 104a and the gate electrode 122c is formed in the transistor 151, even when the oxide semiconductor film 110 is intrinsic or substantially intrinsic, the end portion of the oxide semiconductor film 110 is easily activated to be an n-type region (a low-resistance region) by application of stress such as an electric field.

In the case where the n-type end portions overlap with regions between the first electrode 112a and the second electrode 112b, the n-type regions serve as carrier paths, resulting in formation of a parasitic channel. As a result, drain current with respect to the threshold voltage is gradually increased, so that the threshold voltage of the transistor shifts in the negative direction. However, as illustrated in FIG. 10C, the gate electrode 104a and the gate electrode 122c having the same potentials are included and the gate electrode 122c faces the side surfaces of the oxide semiconductor film 110 in the channel width direction at the side surfaces of the second insulating film 120, whereby an electric field from the gate electrode 122c affects the oxide semiconductor film 110 also from the side surfaces of the oxide semiconductor film 110. As a result, a parasitic channel is prevented from being generated at the side surface of the oxide semiconductor film 110 or the end portion including the side surface and its vicinity. Thus, the transistor having favorable electrical characteristics of a sharp increase in drain current with respect to the threshold voltage is obtained.

The transistor includes the gate electrode 104a and the gate electrode 122c, each of which has a function of blocking an external electric field; thus, charges such as a charged particle between the substrate 102 and the gate electrode 104a and over the gate electrode 122c do not affect the oxide semiconductor film 110. Thus, degradation due to a stress test (e.g., a negative gate bias temperature (−GBT) stress test in which a negative potential is applied to a gate electrode) can be reduced, and changes in the rising voltages of on-state current at different drain voltages can be suppressed.

The BT stress test is one kind of accelerated test and can evaluate, in a short time, change in characteristics (i.e., a change over time) of transistors, which is caused by long-term use. In particular, the amount of change in threshold voltage of a transistor between before and after the BT stress test is an important indicator when examining the reliability of the transistor. If the amount of change in the threshold voltage between before and after the BT stress test is small, the transistor has higher reliability.

Elements included in the transistor 151 are described below.

<<Substrate 102>>

For the substrate 102, a glass material such as aluminosilicate glass, aluminoborosilicate glass, or barium borosilicate glass is used. In the mass production, for the substrate 102, a mother glass with any of the following sizes is preferably used: the 8-th generation (2160 mm×2460 mm), the 9-th generation (2400 mm×2800 mm or 2450 mm×3050 mm), the 10-th generation (2950 mm×3400 mm), and the like. High process temperature and a long period of process time drastically shrink the mother glass. Thus, in the case where mass production is performed with the use of the mother glass, it is preferable that the heat process in the manufacturing process be performed at a temperature lower than or equal to 600° C., preferably lower than or equal to 450° C., further preferably lower than or equal to 350° C.

<<Gate Electrode 104a>>

As a material used for the gate electrode 104a, a metal element selected from aluminum, chromium, copper, tantalum, titanium, molybdenum, and tungsten, an alloy containing any of these metal elements as a component, an alloy containing these metal elements in combination, or the like can be used. The gate electrode 104a may have a single-layer structure or a stacked-layer structure of two or more layers. For example, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, and the like can be given. Alternatively, a film, an alloy film, or a nitride film which contains aluminum and one or more elements selected from titanium, tantalum, tungsten, molybdenum, chromium, neodymium, and scandium may be used. The gate electrode 104a can be formed by a sputtering method, for example.

<<First Insulating Film 108>>

An example in which the first insulating film 108 has a two-layer structure of the insulating film 106 and the insulating film 107 is illustrated. Note that the structure of the first insulating film 108 is not limited thereto, and for example, the first insulating film 108 may have a single-layer structure or a stacked-layer structure including three or more layers.

The insulating film 106 is formed with a single-layer structure or a stacked-layer structure using, for example, any of a silicon nitride oxide film, a silicon nitride film, an aluminum oxide film, and the like with a PE-CVD apparatus. In the case where the insulating film 106 has a stacked-layer structure, it is preferable that a silicon nitride film with fewer defects be provided as a first silicon nitride film, and a silicon nitride film from which hydrogen and ammonia are less likely to be released be provided over the first silicon nitride film, as a second silicon nitride film. As a result, hydrogen and nitrogen contained in the insulating film 106 can be inhibited from moving or diffusing into the oxide semiconductor film 110 to be formed later.

The insulating film 107 is formed with a single-layer structure or a stacked-layer structure using any of a silicon oxide film, a silicon oxynitride film, and the like with a PE-CVD apparatus.

The first insulating film 108 can have a stacked-layer structure, for example, in which a 400-nm-thick silicon nitride film used as the insulating film 106 and a 50-nm-thick silicon oxynitride film used as the insulating film 107 are formed in this order. The silicon nitride film and the silicon oxynitride film are preferably formed in succession in a vacuum, in which case entry of impurities is suppressed. The first insulating film 108 in a position overlapping with the gate electrode 104a serves as a gate insulating film of the transistor 151. Note that silicon nitride oxide refers to an insulating material that contains more nitrogen than oxygen, whereas silicon oxynitride refers to an insulating material that contains more oxygen than nitrogen.

<<Oxide Semiconductor Film 110>>

The oxide semiconductor film 110 preferably includes a film represented by an In-M-Zn oxide that contains at least indium (In), zinc (Zn), and M (M is a metal such as Al, Ga, Ge, Y, Zr, Sn, La, Ce, or Hf). Alternatively, both In and Zn are preferably contained. In order to reduce fluctuations in electrical characteristics of the transistors including the oxide semiconductor, the oxide semiconductor preferably contains a stabilizer in addition to In and Zn.

As a stabilizer, gallium (Ga), tin (Sn), hafnium (Hf), aluminum (Al), zirconium (Zr), and the like can be given. As another stabilizer, lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) can be given.

As the oxide semiconductor included in the oxide semiconductor film 110, any of the following can be used: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

Note that here, for example, an "In—Ga—Zn-based oxide" means an oxide containing In, Ga, and Zn as its main components and there is no limitation on the ratio of In:Ga:Zn. The In—Ga—Zn-based oxide may contain another metal element in addition to In, Ga, and Zn.

The oxide semiconductor film 110 can be formed by a sputtering method, a molecular beam epitaxy (MBE) method, a CVD method, a pulse laser deposition method, an atomic layer deposition (ALD) method, or the like as appropriate. In particular, the oxide semiconductor film 110 is preferably formed by the sputtering method because the oxide semiconductor film 110 can be dense.

In the formation of an oxide semiconductor film as the oxide semiconductor film 110, the hydrogen concentration in the oxide semiconductor film is preferably reduced as much as possible. To reduce the hydrogen concentration, for example, in the case of a sputtering method, a deposition chamber needs to be highly evacuated and also a sputtering gas needs to be highly purified. As an oxygen gas or an argon gas used for a sputtering gas, a gas which is highly purified to have a dew point of −40° C. or lower, preferably −80° C. or lower, further preferably −100° C. or lower, or still further preferably −120° C. or lower is used, whereby entry of moisture or the like into the oxide semiconductor film can be minimized.

In order to remove moisture remaining in the deposition chamber, an entrapment vacuum pump, such as a cryopump, an ion pump, or a titanium sublimation pump, is preferably used. A turbo molecular pump provided with a cold trap may be alternatively used. When the deposition chamber is evacuated with a cryopump, which has a high capability in removing a hydrogen molecule, a compound including a hydrogen atom such as water ($H_2O$), a compound including a carbon atom, and the like, the concentration of an impurity to be contained in a film formed in the deposition chamber can be reduced.

When the oxide semiconductor film as the oxide semiconductor film 110 is formed by a sputtering method, the relative density (filling factor) of a metal oxide target that is used for the film formation is greater than or equal to 90% and less than or equal to 100%, preferably greater than or equal to 95% and less than or equal to 100%. With the use of the metal oxide target having high relative density, a dense oxide semiconductor film can be formed.

Note that to reduce the impurity concentration of the oxide semiconductor film, it is also effective to form the oxide semiconductor film as the oxide semiconductor film 110 while the substrate 102 is kept at high temperature. The heating temperature of the substrate 102 may be higher than or equal to 150° C. and lower than or equal to 450° C., and preferably the substrate temperature is higher than or equal to 200° C. and lower than or equal to 350° C.

Next, first heat treatment is preferably performed. The first heat treatment may be performed at a temperature higher than or equal to 250° C. and lower than or equal to 650° C., preferably higher than or equal to 300° C. and lower than or equal to 500° C., in an inert gas atmosphere, an atmosphere containing an oxidizing gas at 10 ppm or more, or a reduced pressure state. Alternatively, the first heat treatment may be performed in such a manner that heat treatment is performed in an inert gas atmosphere, and then another heat treatment is performed in an atmosphere containing an oxidizing gas at 10 ppm or more, in order to compensate for desorbed oxygen. By the first heat treatment, the crystallinity of the oxide semiconductor that is used as the oxide semiconductor film 110 can be improved, and in addition, impurities such as hydrogen and water can be removed from the first insulating film 108 and the oxide semiconductor film 110. The first heat treatment may be performed before the oxide semiconductor film 110 is processed into an island shape.

<<First Electrode and Second Electrode>>

The first electrode 112a and the second electrode 112b can be formed using a conductive film 112 having a single-layer structure or a stacked-layer structure with any of metals such as aluminum, titanium, chromium, nickel, copper, yttrium, zirconium, molybdenum, silver, tantalum, and tungsten, or an alloy containing any of these metals as its main component. In particular, one or more elements selected from aluminum, chromium, copper, tantalum, titanium, molybdenum, and tungsten are preferably included. For example, a two-layer structure in which a titanium film is stacked over an aluminum film, a two-layer structure in which a titanium film is stacked over a tungsten film, a two-layer structure in which a copper film is formed over a copper-magnesium-aluminum alloy film, a three-layer structure in which a titanium film or a titanium nitride film, an aluminum film or a copper film, and a titanium film or a titanium nitride film are stacked in this order, a three-layer structure in which a molybdenum film or a molybdenum nitride film, an aluminum film or a copper film, and a molybdenum film or a molybdenum nitride film are stacked in this order, and the like can be given. Note that a transparent conductive material containing indium oxide, tin oxide, or zinc oxide may be used. The conductive film can be formed by a sputtering method, for example.

<<Insulating Films 114, 116, and 118>>

An example in which the second insulating film 120 has a three-layer structure of the insulating films 114, 116, and 118 is illustrated. Note that the structure of the second insulating film 120 is not limited thereto, and for example, the second insulating film 120 may have a single-layer structure or a stacked-layer structure including two layers or four or more layers.

For the insulating films 114 and 116, an inorganic insulating material containing oxygen can be used in order to improve the characteristics of the interface with the oxide semiconductor used for the oxide semiconductor film 110. As examples of the inorganic insulating material containing oxygen, a silicon oxide film, a silicon oxynitride film, and the like can be given. The insulating films 114 and 116 can be formed by a PE-CVD method, for example.

The thickness of the insulating film 114 can be greater than or equal to 5 nm and less than or equal to 150 nm, preferably greater than or equal to 5 nm and less than or equal to 50 nm, more preferably greater than or equal to 10 nm and less than or equal to 30 nm. The thickness of the insulating film 116 can be greater than or equal to 30 nm and less than or equal to 500 nm, preferably greater than or equal to 150 nm and less than or equal to 400 nm.

Further, the insulating films 114 and 116 can be formed using insulating films formed of the same kinds of materials; thus, a boundary between the insulating films 114 and 116 cannot be clearly observed in some cases. Thus, in this embodiment, the boundary between the insulating films 114 and 116 is shown by a dashed line. Although a two-layer structure of the insulating films 114 and 116 is described in this embodiment, the present invention is not limited to this. For example, a single-layer structure of the insulating film 114, a single-layer structure of the insulating film 116, or a stacked-layer structure including three or more layers may be used.

The insulating film 118 is a film formed using a material that can prevent an external impurity, such as water, alkali metal, or alkaline earth metal, from diffusing into the oxide semiconductor film 110, and that further contains hydrogen.

For example, a silicon nitride film, a silicon nitride oxide film, or the like having a thickness of greater than or equal to 150 nm and less than or equal to 400 nm can be used as the insulating film 118. In this embodiment, a 150-nm-thick silicon nitride film is used as the insulating film 118.

The silicon nitride film is preferably formed at a high temperature to have an improved blocking property against impurities or the like; for example, the silicon nitride film is preferably formed at a temperature in the range from the substrate temperature of 100° C. to the strain point of the substrate, more preferably at a temperature in the range from 300° C. to 400° C. When the silicon nitride film is formed at a high temperature, a phenomenon in which oxygen is released from the oxide semiconductor used for the oxide semiconductor film 110 and the carrier concentration is increased is caused in some cases; therefore, the upper limit of the temperature is a temperature at which the phenomenon is not caused.

<<Conductive Film 122a and Gate Electrode 122c>>

For the conductive film used as the conductive film 122a and the gate electrode 122c, an oxide containing indium may be used. For example, a light-transmitting conductive material such as indium oxide containing tungsten oxide, indium zinc oxide containing tungsten oxide, indium oxide containing titanium oxide, indium tin oxide containing titanium oxide, indium tin oxide (hereinafter referred to as ITO), indium zinc oxide, or indium tin oxide to which silicon oxide is added can be used. The conductive film that can be used as the conductive film 122a and the gate electrode 122c can be formed by a sputtering method, for example.

Note that the structures, methods, and the like described in this embodiment can be used as appropriate in combination with any of the structures, methods, and the like described in the other embodiments.

Embodiment 5

In this embodiment, an example of an oxide semiconductor film that can be used in the transistor 151 in Embodiment 4 is described.

<Crystallinity of Oxide Semiconductor Film>

A structure of the oxide semiconductor film is described below.

An oxide semiconductor film is classified roughly into a single-crystal oxide semiconductor film and a non-single-crystal oxide semiconductor film. The non-single-crystal oxide semiconductor film includes any of a c-axis aligned crystalline oxide semiconductor (CAAC-OS) film, a polycrystalline oxide semiconductor film, a microcrystalline oxide semiconductor film, an amorphous oxide semiconductor film, and the like.

First, a CAAC-OS film is described.

The CAAC-OS film is one of oxide semiconductor films including a plurality of crystal parts, and most of the crystal parts each fit inside a cube whose one side is less than 100 nm. Thus, there is a case where a crystal part included in the CAAC-OS film fits inside a cube whose one side is less than 10 nm, less than 5 nm, or less than 3 nm.

In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur.

According to the TEM image of the CAAC-OS film observed in a direction substantially parallel to a sample surface (cross-sectional TEM image), metal atoms are arranged in a layered manner in the crystal parts. Each metal atom layer has a morphology reflected by a surface over which the CAAC-OS film is formed (hereinafter, a surface over which the CAAC-OS film is formed is referred to as a formation surface) or a top surface of the CAAC-OS film, and is arranged in parallel to the formation surface or the top surface of the CAAC-OS film.

In this specification, the term "parallel" indicates that the angle formed between two straight lines is greater than or equal to −10° and less than or equal to 10°, and accordingly also includes the case where the angle is greater than or equal to −5° and less than or equal to 5°. The term "perpendicular" indicates that the angle formed between two straight lines is greater than or equal to 80° and less than or equal to 100°, and accordingly includes the case where the angle is greater than or equal to 85° and less than or equal to 95°.

On the other hand, according to the TEM image of the CAAC-OS film observed in a direction substantially perpendicular to the sample surface (plan TEM image), metal atoms are arranged in a triangular or hexagonal configuration in the crystal parts. However, there is no regularity of arrangement of metal atoms between different crystal parts.

From the results of the cross-sectional TEM image and the plan TEM image, alignment is found in the crystal parts in the CAAC-OS film.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle (2θ) is around 31°. This peak is derived from the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

On the other hand, when the CAAC-OS film is analyzed by an in-plane method in which an X-ray enters a sample in a direction substantially perpendicular to the c-axis, a peak appears frequently when 2θ is around 56°. This peak is derived from the (110) plane of the $InGaZnO_4$ crystal. Here, analysis (φ scan) is performed under conditions where the sample is rotated around a normal vector of a sample surface as an axis (φ axis) with 2θ fixed at around 56°. In the case where the sample is a single-crystal oxide semiconductor film of $InGaZnO_4$, six peaks appear. The six peaks are derived from crystal planes equivalent to the (110) plane. On the other hand, in the case of a CAAC-OS film, a peak is not clearly observed even when φ scan is performed with 2θ fixed at around 56°.

According to the above results, in the CAAC-OS film having c-axis alignment, while the directions of a-axes and b-axes are different between crystal parts, the c-axes are aligned in a direction parallel to a normal vector of a formation surface or a normal vector of a top surface. Thus, each metal atom layer arranged in a layered manner observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned in a direction parallel to a normal vector of a formation surface or a normal vector of a top surface. Thus, for example, in the case where a shape of the CAAC-OS film is changed by etching or the like, the c-axis might not be necessarily parallel to a normal vector of a formation surface or a normal vector of a top surface of the CAAC-OS film.

Further, the degree of crystallinity in the CAAC-OS film is not necessarily uniform. For example, in the case where crystal growth leading to the CAAC-OS film occurs from the vicinity of the top surface of the film, the degree of the crystallinity in the vicinity of the top surface is higher than that in the vicinity of the formation surface in some cases. Further, when an impurity is added to the CAAC-OS film, the crystallinity in a region to which the impurity is added is changed, and the degree of crystallinity in the CAAC-OS film varies depending on regions.

Note that when the CAAC-OS film with an $InGaZnO_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS film, a peak of 2θ appear at around 31° and a peak of 2θ do not appear at around 36°.

In this specification, trigonal and rhombohedral crystal systems are included in a hexagonal crystal system.

The CAAC-OS film is an oxide semiconductor film having a low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic arrangement of the oxide semiconductor film by depriving the oxide semiconductor film of oxygen and causes a decrease in crystallinity. Further, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states.

With the use of the CAAC-OS film in a transistor, variation in the electrical characteristics of the transistor due to irradiation with visible light or ultraviolet light is small.

Next, a microcrystalline oxide semiconductor film is described.

In an image obtained with the TEM, crystal parts cannot be found clearly in the microcrystalline oxide semiconductor film in some cases. In most cases, the size of a crystal part in the microcrystalline oxide semiconductor film is greater than or equal to 1 nm and less than or equal to 100 nm, or greater than or equal to 1 nm and less than or equal to 10 nm. A microcrystal with a size greater than or equal to 1 nm and less than or equal to 10 nm, or a size greater than or equal to 1 nm and less than or equal to 3 nm is specifically referred to as nanocrystal (nc). An oxide semiconductor film including nanocrystal is referred to as a nanocrystalline oxide semiconductor (nc-OS) film. In an image obtained with TEM, a grain boundary cannot be found clearly in the nc-OS film in some cases.

In the nc-OS film, a microscopic region (for example, a region with a size greater than or equal to 1 nm and less than or equal to 10 nm, in particular, a region with a size greater than or equal to 1 nm and less than or equal to 3 nm) has a periodic atomic order. Note that there is no regularity of crystal orientation between different crystal parts in the nc-OS film. Thus, the orientation of the whole film is not observed. Accordingly, in some cases, the nc-OS film cannot be distinguished from an amorphous oxide semiconductor film depending on an analysis method. For example, when the nc-OS film is subjected to structural analysis by an out-of-plane method with an XRD apparatus using an X-ray having a diameter larger than that of a crystal part, a peak which shows a crystal plane does not appear. Furthermore, a halo pattern is shown in an electron diffraction pattern (also referred to as a selected-area electron diffraction pattern) of the nc-OS film obtained by using an electron beam having a probe diameter (e.g., greater than or equal to 50 nm) larger than the diameter of a crystal part. Meanwhile, spots are shown in a nanobeam electron diffraction pattern of the nc-OS film obtained by using an electron beam having a probe diameter (e.g., greater than or equal to 1 nm and smaller than or equal to 30 nm) close to, or smaller than or equal to a diameter of a crystal part. Further, in a nanobeam electron diffraction pattern of the nc-OS film, regions with high luminance in a circular (ring) pattern are observed in some cases. Also in a nanobeam electron diffraction pattern of the nc-OS film, a plurality of spots are shown in a ring-like region in some cases.

The nc-OS film is an oxide semiconductor film that has high regularity as compared to an amorphous oxide semiconductor film. Therefore, the nc-OS film has a lower density of defect states than an amorphous oxide semiconductor film. Note that there is no regularity of crystal orientation between different crystal parts in the nc-OS film. Therefore, the nc-OS film has a higher density of defect states than the CAAC-OS film.

Note that an oxide semiconductor film may be a stacked film including two or more kinds of an amorphous oxide semiconductor film, a microcrystalline oxide semiconductor film, and a CAAC-OS film, for example.

<Method for Forming CAAC-OS Film>

For example, a CAAC-OS film is deposited by a sputtering method using a polycrystalline oxide semiconductor sputtering target. When ions collide with the sputtering target, a crystal region included in the sputtering target may be separated from the target along an a-b plane; in other words, a sputtered particle having a plane parallel to an a-b plane (flat-plate-like sputtered particle or pellet-like sputtered particle) may flake off from the sputtering target. In that case, the flat-plate-like or pellet-like sputtered particle reaches a substrate while maintaining its crystal state, whereby the CAAC-OS film can be formed.

The flat-plate-like or pellet-like sputtered particle has, for example, an equivalent circle diameter of a plane parallel to the a-b plane of greater than or equal to 3 nm and less than or equal to 10 nm, and a thickness (length in the direction perpendicular to the a-b plane) of greater than or equal to 0.7 nm and less than 1 nm. Note that in the flat-plate-like or pellet-like sputtered particle, the plane parallel to the a-b plane may be a regular triangle or a regular hexagon. Here, the term "equivalent circle diameter of a plane" refers to the diameter of a perfect circle having the same area as the plane.

For the deposition of the CAAC-OS film, the following conditions are preferably used.

By increasing the substrate temperature during the deposition, migration of sputtered particles is likely to occur after the sputtered particles reach a substrate surface. Specifically, the substrate temperature during the deposition is higher than or equal to 100° C. and lower than or equal to 740° C., preferably higher than or equal to 200° C. and lower than or equal to 500° C. By increasing the substrate temperature during the deposition, when the flat-plate-like or pellet-like sputtered particles reach the substrate, migration occurs on the substrate surface, so that a flat plane of the sputtered particles is attached to the substrate. At this time, the sputtered particle is charged positively, whereby sputtered particles are attached to the substrate while repelling each other; thus, the sputtered particles do not overlap with each other randomly, and a CAAC-OS film with a uniform thickness can be deposited.

By reducing the amount of impurities entering the CAAC-OS film during the deposition, the crystal state can be prevented from being broken by the impurities. For example, the concentration of impurities (e.g., hydrogen, water, carbon dioxide, or nitrogen) which exist in the deposition chamber may be reduced. Furthermore, the concentration of impurities in a deposition gas may be reduced. Specifically, a deposition gas whose dew point is −80° C. or lower, preferably −100° C. or lower is used.

Furthermore, it is preferable that the proportion of oxygen in the deposition gas be increased and the power be optimized in order to reduce plasma damage at the deposition. The proportion of oxygen in the deposition gas is higher than or equal to 30 vol %, preferably 100 vol %.

Alternatively, the CAAC-OS film is formed by the following method.

First, a first oxide semiconductor film is formed to a thickness of greater than or equal to 1 nm and less than 10 nm. The first oxide semiconductor film is formed by a sputtering method. Specifically, the substrate temperature is set to higher than or equal to 100° C. and lower than or equal to 500° C., preferably higher than or equal to 150° C. and lower than or equal to 450° C. and the proportion of oxygen in a deposition gas is set to higher than or equal to 30 vol %, preferably 100 vol %.

Next, heat treatment is performed so that the first oxide semiconductor film becomes a first CAAC-OS film with high crystallinity. The temperature of the heat treatment is higher than or equal to 350° C. and lower than or equal to 740° C., preferably higher than or equal to 450° C. and lower than or equal to 650° C. The heat treatment time is longer than or equal to 1 minute and shorter than or equal to 24 hours, preferably longer than or equal to 6 minutes and shorter than or equal to 4 hours. The heat treatment may be performed in an inert atmosphere or an oxidation atmosphere. It is preferable to perform heat treatment in an inert atmosphere and then perform heat treatment in an oxidation atmosphere. The heat treatment in an inert atmosphere can reduce the concentration of impurities in the first oxide semiconductor film in a short time. At the same time, the heat treatment in an inert atmosphere may generate oxygen vacancies in the first oxide semiconductor film. In such a case, the heat treatment in an oxidation atmosphere can reduce the oxygen vacancies. Note that the heat treatment may be performed under a reduced pressure, such as 1000 Pa or lower, 100 Pa or lower, 10 Pa or lower, or 1 Pa or lower. The heat treatment under the reduced pressure can reduce the concentration of impurities in the first oxide semiconductor film in a shorter time.

The first oxide semiconductor film with a thickness of greater than or equal to 1 nm and less than 10 nm can be easily crystallized by heat treatment as compared to the case where the first oxide semiconductor film has a thickness of greater than or equal to 10 nm.

Next, a second oxide semiconductor film having the same composition as the first oxide semiconductor film is formed to a thickness of greater than or equal to 10 nm and less than or equal to 50 nm. The second oxide semiconductor film is formed by a sputtering method. Specifically, the substrate temperature is set to higher than or equal to 100° C. and lower than or equal to 500° C., preferably higher than or equal to 150° C. and lower than or equal to 450° C., and the proportion of oxygen in a deposition gas is set to higher than or equal to 30 vol %, preferably 100 vol %.

Next, heat treatment is performed so that solid phase growth of the second oxide semiconductor film is performed using the first CAAC-OS film, thereby forming a second CAAC-OS film with high crystallinity. The temperature of the heat treatment is higher than or equal to 350° C. and lower than or equal to 740° C., preferably higher than or equal to 450° C. and lower than or equal to 650° C. The heat treatment time is longer than or equal to 1 minute and shorter than or equal to 24 hours, preferably longer than or equal to 6 minutes and shorter than or equal to 4 hours. The heat treatment may be performed in an inert atmosphere or an oxidation atmosphere. It is preferable to perform heat treatment in an inert atmosphere and then perform heat treatment in an oxidation atmosphere. The heat treatment in an inert atmosphere can reduce the concentration of impurities in the second oxide semiconductor film in a short time. At the same time, the heat treatment in an inert atmosphere may generate oxygen vacancies in the second oxide semiconductor film. In such a case, the heat treatment in an oxidation atmosphere can reduce the oxygen vacancies. Note that the heat treatment may be performed under a reduced pressure, such as 1000 Pa or lower, 100 Pa or lower, 10 Pa or lower, or 1 Pa or lower. The heat treatment under the reduced pressure can reduce the concentration of impurities in the second oxide semiconductor film in a shorter time.

In the above manner, a CAAC-OS film with a total thickness of greater than or equal to 10 nm can be formed. The CAAC-OS film can be favorably used as the oxide semiconductor film in an oxide stack.

Next, a method for forming an oxide film in the case where a formation surface has a low temperature because, for example, the substrate is not heated is described (for example, the temperature is lower than 130° C., lower than 100° C. lower than 70° C. or at room temperatures (20° C. to 25° C.)).

In the case where the formation surface has a low temperature, sputtered particles fall irregularly to the formation surface. For example, migration does not occur; therefore, the sputtered particles are randomly deposited on the formation surface including a region where other sputtered particles have been deposited. That is, an oxide film obtained by the deposition might have a non-uniform thickness and a disordered crystal alignment. The oxide film obtained in the above manner maintains the crystallinity of the sputtered particles to a certain degree and thus has a crystal part (nanocrystal).

For example, in the case where the pressure at the deposition is high, the frequency with which the flying sputtered particle collides with another particle (e.g., an atom, a molecule, an ion, or a radical) of argon or the like is increased. When the flying sputtered particle collides with another particle (resputtered), the crystal structure of the sputtered particle might be broken. For example, when the sputtered particle collides with another particle, the flat-plate-like or pellet-like shape of the sputtered particle cannot be kept, and the sputtered particle might be broken into parts (e.g., atomized). At this time, when atoms obtained from the sputtered particle are deposited on the formation surface, an amorphous oxide film might be formed.

In the case where not a sputtering method using a target including a polycrystalline oxide but a deposition method using liquid or a method for depositing a film by vaporizing a solid such as a target is used, the atoms separately fly to be deposited on the formation surface; therefore, an amorphous oxide film might be formed. Furthermore, for example, by a laser ablation method, atoms, molecules, ions, radicals, clusters, or the like released from the target flies to be deposited on the formation surface; therefore, an amorphous oxide film might be formed.

An oxide semiconductor film included in a resistor and a transistor in one embodiment of the present invention may have any of the above crystal states. Further, in the case of stacked oxide semiconductor films, the crystal states of the oxide semiconductor films may be different from each other. Note that a CAAC-OS film is preferably used as the oxide semiconductor film functioning as a channel of the transistor. Further, the oxide semiconductor film included in the resistor has a higher impurity concentration than that of the oxide semiconductor film included in the transistor; thus, the crystallinity is lowered in some cases.

The structures, the methods, and the like described in this embodiment can be combined as appropriate with any of the structures, the methods, and the like described in the other embodiments.

Embodiment 6

In this embodiment, a structure of a display panel that can be used in the display device of one embodiment of the present invention is described with reference to FIGS. 11A to 11C. Note that the display panel described in this embodiment includes a touch sensor (a contact sensor device) that overlaps with a display portion; thus, the display panel can be called a touch panel (an input/output device).

Figure 11A:
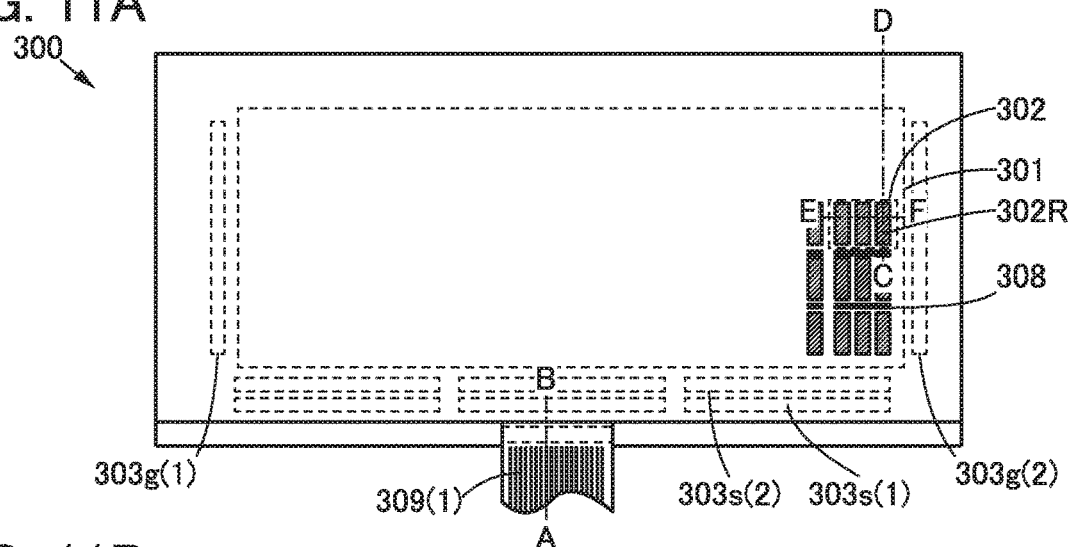
FIGS. 11A to 11C illustrate a structure of a display panel that can be used for a display device of an embodiment.

FIG. 11A is a plan view illustrating the structure of a display panel that can be used in the display device of one embodiment of the present invention.

Figure 11B:
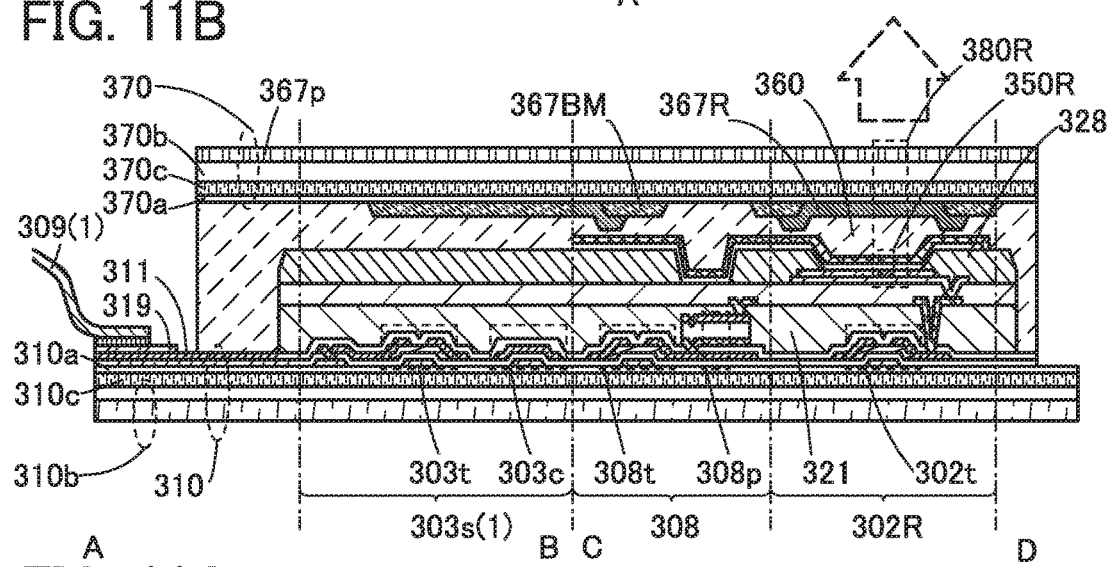

FIG. 11B is a cross-sectional view taken along line A-B and line C-D in FIG. 11A.

Figure 11C:
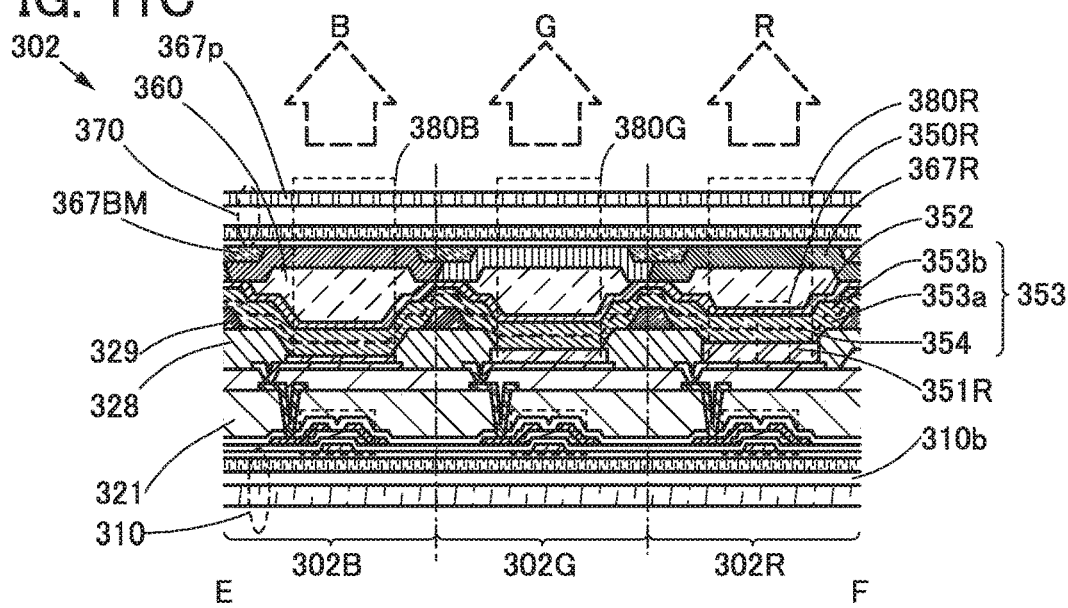

FIG. 11C is a cross-sectional view taken along line E-F in FIG. 11A.

<Top View>

An input/output device 300 described as an example in this embodiment includes a display portion 301 (see FIG. 11A).

The display portion 301 includes a plurality of pixels 302 and a plurality of imaging pixels 308. The imaging pixels 308 can sense a touch of a finger or the like on the display portion 301. Thus, a touch sensor can be formed using the imaging pixels 308.

Each of the pixels 302 includes a plurality of sub-pixels (e.g., a sub-pixel 302R). In addition, in the sub-pixels, light-emitting elements and pixel circuits that can supply electric power for driving the light-emitting elements are provided.

The pixel circuits are electrically connected to wirings through which selection signals are supplied and wirings through which image signals are supplied.

Furthermore, the input/output device 300 is provided with a scan line driver circuit 303g(1) that can supply selection signals to the pixels 302 and an image signal line driver circuit 303s(1) that can supply image signals to the pixels 302. Note that when the image signal line driver circuit 303s(1) is placed in a portion other than a bendable portion, malfunction can be inhibited.

The imaging pixels 308 include photoelectric conversion elements and imaging pixel circuits that drive the photoelectric conversion elements.

The imaging pixel circuits are electrically connected to wirings through which control signals are supplied and wirings through which power supply potentials are supplied.

Examples of the control signals include a signal for selecting an imaging pixel circuit from which a recorded imaging signal is read, a signal for initializing an imaging pixel circuit, and a signal for determining the time it takes for an imaging pixel circuit to detect light.

The input/output device 300 is provided with an imaging pixel driver circuit 303g(2) that can supply control signals to the imaging pixels 308 and an imaging signal line driver circuit 303s(2) that reads out imaging signals. Note that when the imaging signal line driver circuit 303s(2) is placed in a portion other than a bendable portion, malfunction can be inhibited.

<Cross-Sectional View>

The input/output device 300 includes a substrate 310 and a counter substrate 370 that faces the substrate 310 (see FIG. 11B).

The substrate 310 is a stacked body in which a substrate 310b having flexibility, a barrier film 310a that prevents diffusion of unintentional impurities to the light-emitting elements, and an adhesive layer 310c that attaches the barrier film 310a to the substrate 310b are stacked.

The counter substrate 370 is a stacked body including a substrate 370b having flexibility, a barrier film 370a that prevents diffusion of unintentional impurities to the light-emitting elements, and an adhesive layer 370c that attaches the barrier film 370a to the substrate 370b (see FIG. 11B).

A sealant 360 attaches the counter substrate 370 to the substrate 310. The sealant 360, also serving as an optical adhesive layer, has a refractive index higher than that of air. The pixel circuits and the light-emitting elements (e.g., a first light-emitting element 350R) and the imaging pixel circuits and photoelectric conversion elements (e.g., a photoelectric conversion element 308p) are provided between the substrate 310 and the counter substrate 370.

<<Structure of Pixel>>

Each of the pixels 302 includes the sub-pixel 302R, a sub-pixel 302G, and a sub-pixel 302B (see FIG. 11C). The sub-pixel 302R includes a light-emitting module 380R, the sub-pixel 302G includes a light-emitting module 380G, and the sub-pixel 302B includes a light-emitting module 380B.

For example, the sub-pixel 302R includes the first light-emitting element 350R and the pixel circuit that can supply electric power to the first light-emitting element 350R and includes a transistor 302t (see FIG. 11B). Furthermore, the light-emitting module 380R includes the first light-emitting element 350R and an optical element (e.g., a first coloring layer 367R).

The first light-emitting element 350R includes a first lower electrode 351R, an upper electrode 352, and a layer 353 containing a light-emitting organic compound between the first lower electrode 351R and the upper electrode 352 (see FIG. 11C).

The layer 353 containing a light-emitting organic compound includes a light-emitting unit 353a, a light-emitting unit 353b, and an intermediate layer 354 between the light-emitting units 353a and 353b.

The light-emitting module 380R includes the first coloring layer 367R on the counter substrate 370. The coloring layer transmits light of a particular wavelength and is, for example, a layer that selectively transmits light of red, green, or blue color. A region that transmits light emitted from the light-emitting element as it is may be provided as well.

The light-emitting module 380R, for example, includes the sealant 360 that is in contact with the first light-emitting element 350R and the first coloring layer 367R.

The first coloring layer 367R is positioned in a region overlapping with the first light-emitting element 350R. Accordingly, part of light emitted from the first light-emitting element 350R passes through the sealant 360 that also serves as an optical adhesive layer and through the first coloring layer 367R and is emitted to the outside of the light-emitting module 380R as indicated by arrows in FIGS. 11B and 11C.

<<Structure of Input/Output Device>>

The input/output device 300 includes a light-blocking layer 367BM on the counter substrate 370. The light-blocking layer 367BM is provided so as to surround the coloring layer (e.g., the first coloring layer 367R).

The input/output device 300 includes an anti-reflective layer 367p positioned in a region overlapping with the display portion 301. As the anti-reflective layer 367p, a circular polarizing plate can be used, for example.

The input/output device 300 includes an insulating film 321. The insulating film 321 covers the transistor 302t. Note that the insulating film 321 can be used as a layer for planarizing unevenness caused by the pixel circuits. An insulating film on which a layer that can prevent diffusion of impurities to the transistor 302t and the like is stacked can be used as the insulating film 321.

The input/output device 300 includes the light-emitting elements (e.g., the first light-emitting element 350R) over the insulating film 321.

The input/output device 300 includes, over the insulating film 321, a partition wall 328 that overlaps with an end portion of the first lower electrode 351R (see FIG. 11C). In addition, a spacer 329 that controls the distance between the substrate 310 and the counter substrate 370 is provided on the partition wall 328.

<<Structure of Image Signal Line Driver Circuit>>

The image signal line driver circuit 303s(1) includes a transistor 303t and a capacitor 303c. Note that the image signal line driver circuit 303s(1) can be formed in the same process and over the same substrate as those of the pixel circuits.

<<Structure of Imaging Pixel>>

The imaging pixels 308 each include a photoelectric conversion element 308p and an imaging pixel circuit for sensing light received by the photoelectric conversion element 308p. The imaging pixel circuit includes a transistor 308t.

For example, a PIN photodiode can be used as the photoelectric conversion element 308*p*.

<<Other Structures>>

The input/output device 300 includes a wiring 311 through which a signal can be supplied. The wiring 311 is provided with a terminal 319. Note that an FPC 309(1) through which a signal such as an image signal or a synchronization signal can be supplied is electrically connected to the terminal 319. The FPC 309(1) is preferably placed in a portion other than a bendable portion of the input/output device 300. Moreover, the FPC 309(1) is preferably placed at almost the center of one side of a region surrounding the display portion 301, especially a side which is folded (a longer side in FIG. 11A). Accordingly, the distance between an external circuit for driving the input/output device 300 and the input/output device 300 can be made short, resulting in easy connection. Furthermore, the center of gravity of the external circuit can be made almost the same as that of the input/output device 300. As a result, an information processor can be treated easily and mistakes such as dropping can be prevented.

Note that a printed wiring board (PWB) may be attached to the FPC 309(1).

This embodiment can be combined with any of the other embodiments in this specification as appropriate.

Embodiment 7

In this embodiment, a structure of a display panel that can be used in the display device of one embodiment of the present invention is described with reference to FIGS. 12A and 12B and FIG. 13. Note that the display panel described in this embodiment includes a touch sensor (a contact sensor device) that overlaps with a display portion; thus, the display panel can be called a touch panel (an input/output device).

Figure 12A:
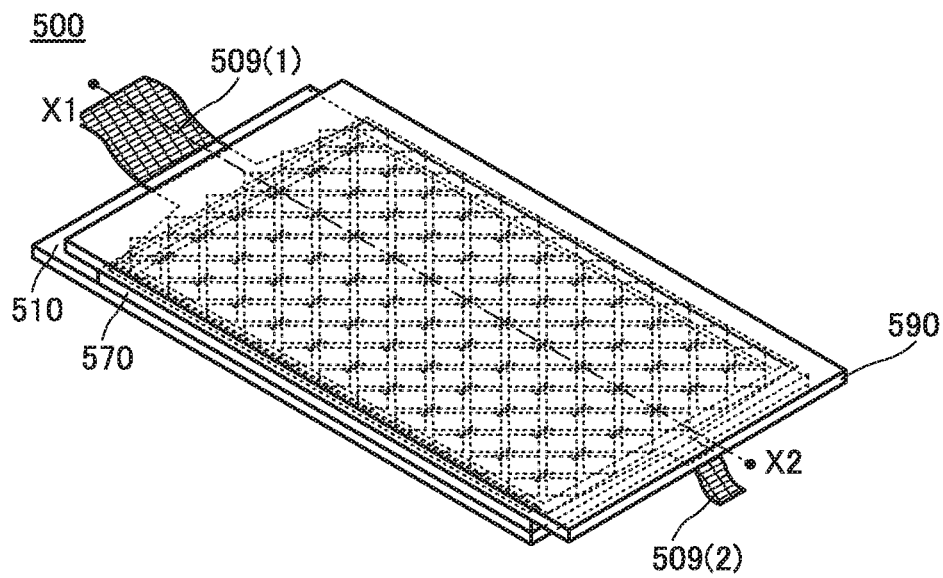
FIGS. 12A and 12B illustrate a structure of a display panel that can be used for a display device of an embodiment.

FIG. 12A is a schematic perspective view of a touch panel 500 described as an example in this embodiment. Note that FIGS. 12A and 12B illustrate only main components for simplicity. FIG. 12B is a developed view of the schematic perspective view of the touch panel 500.

Figure 13:
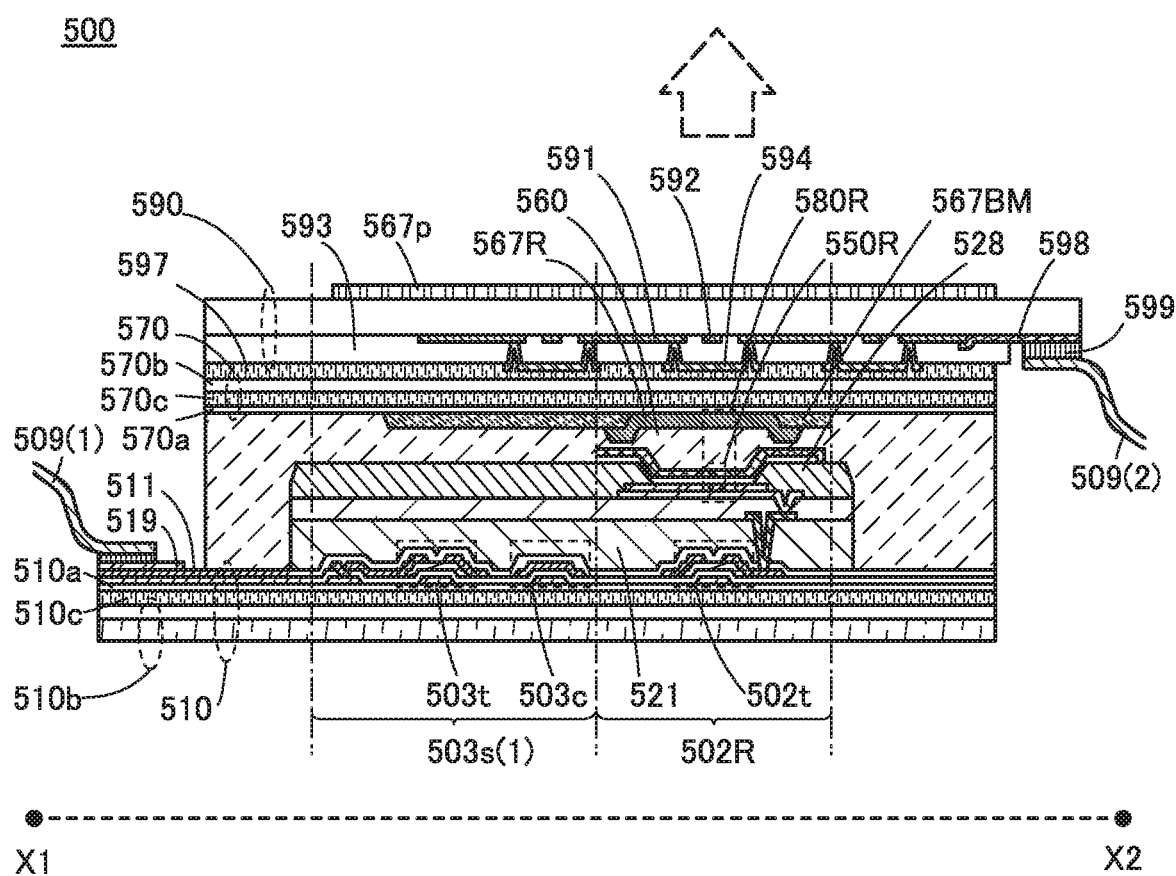
FIG. 13 illustrates a structure of a display panel that can be used for a display device of an embodiment.

FIG. 13 is a cross-sectional view of the touch panel 500 taken along line X1-X2 in FIG. 12A.

Figure 12B:
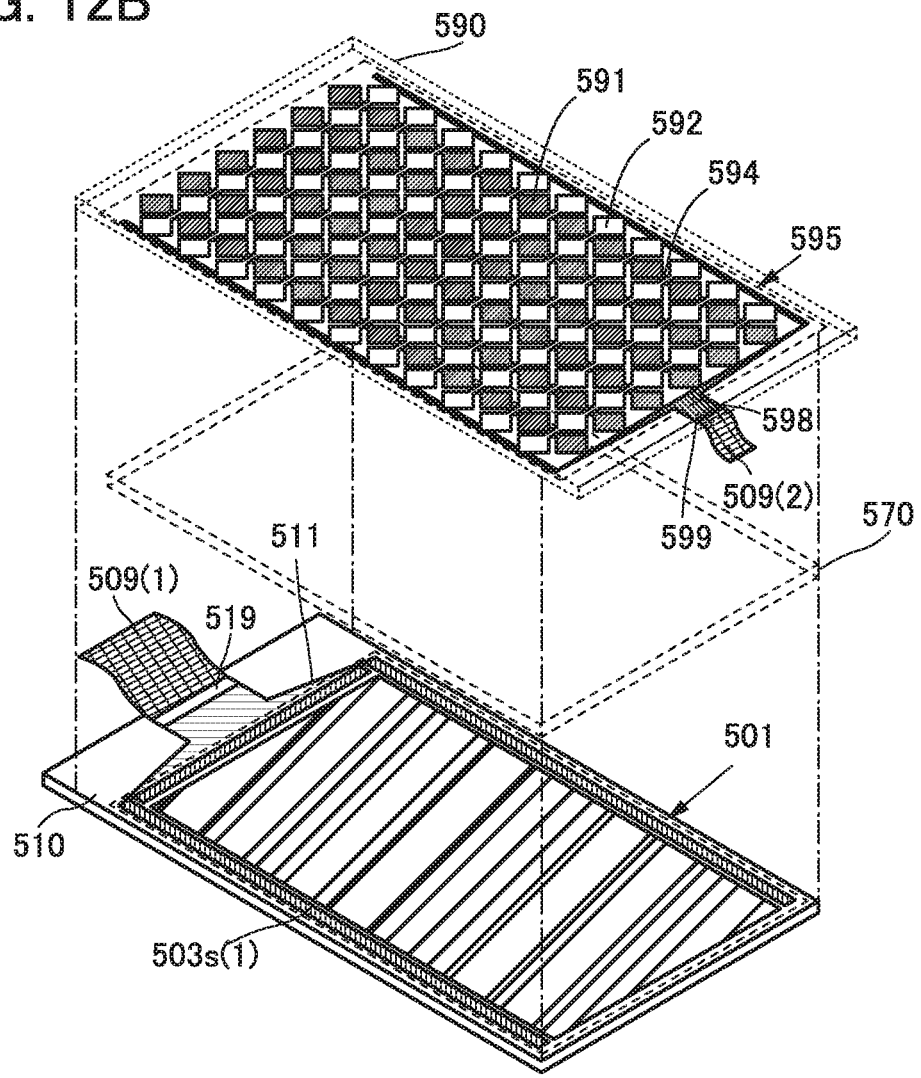

The touch panel 500 includes a display portion 501 and a touch sensor 595 (see FIG. 12B). Furthermore, the touch panel 500 includes a substrate 510, a substrate 570, and a substrate 590. Note that the substrate 510, the substrate 570, and the substrate 590 each have flexibility.

The display portion 501 includes the substrate 510, a plurality of pixels over the substrate 510, and a plurality of wirings 511 through which signals are supplied to the pixels. The plurality of wirings 511 is led to a peripheral portion of the substrate 510, and part of the plurality of wirings 511 forms a terminal 519. The terminal 519 is electrically connected to an FPC 509(1).

<Touch Sensor>

The substrate 590 includes the touch sensor 595 and a plurality of wirings 598 electrically connected to the touch sensor 595. The plurality of wirings 598 is led to a peripheral portion of the substrate 590, and part of the plurality of wirings 598 forms a terminal for electrical connection to an FPC 509(2). Note that in FIG. 12B, electrodes, wirings, and the like of the touch sensor 595 provided on the back side of the substrate 590 (the side opposite to the viewer side) are indicated by solid lines for clarity.

As a touch sensor used as the touch sensor 595, a capacitive touch sensor is preferably used. Examples of the capacitive touch sensor are a surface capacitive touch sensor and a projected capacitive touch sensor. Examples of the projected capacitive touch sensor are a self capacitive touch sensor and a mutual capacitive touch sensor, which differ mainly in the driving method. The use of a mutual capacitive touch sensor is preferable because multiple points can be sensed simultaneously.

An example of using a projected capacitive touch sensor is described below with reference to FIG. 12B. Note that a variety of sensors that can sense the closeness or the contact of a sensing target such as a finger can be used.

The projected capacitive touch sensor 595 includes electrodes 591 and electrodes 592. The electrodes 591 are electrically connected to any of the plurality of wirings 598, and the electrodes 592 are electrically connected to any of the other wirings 598.

The electrode 592 is in the form of a series of quadrangles arranged in one direction as illustrated in FIGS. 12A and 12B. Each of the electrodes 591 is in the form of a quadrangle. A wiring 594 electrically connects two electrodes 591 arranged in a direction intersecting with the direction in which the electrode 592 extends. The intersecting area of the electrode 592 and the wiring 594 is preferably as small as possible. Such a structure allows a reduction in the area of a region where the electrodes are not provided, reducing unevenness in transmittance. As a result, unevenness in luminance of light from the touch sensor 595 can be reduced.

Note that the shapes of the electrodes 591 and the electrodes 592 are not limited to the above-mentioned shapes and can be any of a variety of shapes. For example, the plurality of electrodes 591 may be provided so that space between the electrodes 591 are reduced as much as possible, and a plurality of electrodes 592 may be provided with an insulating layer sandwiched between the electrodes 591 and the electrodes 592 and may be spaced apart from each other to form a region not overlapping with the electrodes 591. In that case, between two adjacent electrodes 592, it is preferable to provide a dummy electrode which is electrically insulated from these electrodes, whereby the area of a region having a different transmittance can be reduced.

The structure of the touch panel 500 is described with reference to FIG. 13.

The touch sensor 595 includes the substrate 590, the electrodes 591 and the electrodes 592 provided in a staggered arrangement on the substrate 590, an insulating layer 593 covering the electrodes 591 and the electrodes 592, and the wiring 594 that electrically connects the adjacent electrodes 591 to each other.

An adhesive layer 597 attaches the substrate 590 to the substrate 570 so that the touch sensor 595 overlaps with the display portion 501.

The electrodes 591 and the electrodes 592 are formed using a light-transmitting conductive material. As a light-transmitting conductive material, a conductive oxide such as indium oxide, indium tin oxide, indium zinc oxide, zinc oxide, or zinc oxide to which gallium is added can be used.

The electrodes 591 and the electrodes 592 may be formed by depositing a light-transmitting conductive material on the substrate 590 by a sputtering method and then removing an unnecessary portion by any of various patterning techniques such as photolithography.

The insulating layer 593 covers the electrodes 591 and the electrodes 592. Examples of a material for the insulating layer 593 are a resin such as acrylic or epoxy resin, a resin having a siloxane bond, and an inorganic insulating material such as silicon oxide, silicon oxynitride, or aluminum oxide.

Furthermore, openings reaching the electrodes 591 are formed in the insulating layer 593, and the wiring 594 electrically connects the adjacent electrodes 591. The wiring 594 is preferably formed using a light-transmitting conductive material, in which case the aperture ratio of the touch panel can be increased. Moreover, the wiring 594 is preferably formed using a material that has higher conductivity than those of the electrodes 591 and the electrodes 592.

One electrode 592 extends in one direction, and a plurality of electrodes 592 is provided in the form of stripes.

The wiring 594 intersects with the electrode 592.

Adjacent electrodes 591 are provided with one electrode 592 provided therebetween and are electrically connected by the wiring 594.

Note that the plurality of electrodes 591 is not necessarily arranged in the direction orthogonal to one electrode 592 and may be arranged to intersect with one electrode 592 at an angle of less than 90 degrees.

One wiring 598 is electrically connected to any of the electrodes 591 and 592. Part of the wiring 598 serves as a terminal. For the wiring 598, a metal material such as aluminum, gold, platinum, silver, nickel, titanium, tungsten, chromium, molybdenum, iron, cobalt, copper, or palladium or an alloy material containing any of these metal materials can be used.

Note that an insulating layer that covers the insulating layer 593 and the wiring 594 may be provided to protect the touch sensor 595.

Furthermore, a connection layer 599 electrically connects the wiring 598 to the FPC 509(2).

As the connection layer 599, any of various anisotropic conductive films (ACF), anisotropic conductive pastes (ACP), or the like can be used.

The adhesive layer 597 has a light-transmitting property. For example, a thermosetting resin or an ultraviolet curable resin can be used; specifically, a resin such as an acrylic resin, an urethane resin, an epoxy resin, or a resin having a siloxane bond can be used.

<Display Portion>

The touch panel 500 includes a plurality of pixels arranged in a matrix. Each of the pixels includes a display element and a pixel circuit for driving the display element.

In this embodiment, an example of using an organic electroluminescent element that emits white light as a display element will be described; however, the display element is not limited to such element.

As the display element, for example, in addition to organic electroluminescent elements, any of a variety of display elements such as display elements (electronic ink) that perform display by an electrophoretic method, an electronic liquid powder method, or the like; MEMS shutter display elements; and optical interference type MEMS display elements can be used. Note that a structure suitable for employed display elements can be selected from among a variety of structures of pixel circuits.

The substrate 510 is a stacked body in which a flexible substrate 510b, a barrier film 510a that prevents diffusion of unintentional impurities to the light-emitting elements, and an adhesive layer 510c that attaches the barrier film 510a to the substrate 510b are stacked.

The substrate 570 is a stacked body in which a flexible substrate 570b, a barrier film 570a that prevents diffusion of unintentional impurities to the light-emitting elements, and an adhesive layer 570c that attaches the barrier film 570a to the substrate 570b are stacked.

A sealant 560 attaches the substrate 570 to the substrate 510. The sealant 560, also serving as an optical adhesive layer, has a refractive index higher than that of air.

The pixel circuits and the light-emitting elements (e.g., a first light-emitting element 550R) are provided between the substrate 510 and the substrate 570.

<<Structure of Pixel>>

A pixel includes a sub-pixel 502R, and the sub-pixel 502R includes a light-emitting module 580R.

The sub-pixel 502R includes the first light-emitting element 550R and the pixel circuit that can supply electric power to the first light-emitting element 550R and includes a transistor 502t. Furthermore, the light-emitting module 580R includes the first light-emitting element 550R and an optical element (e.g., a first coloring layer 567R).

The first light-emitting element 550R includes a lower electrode, an upper electrode, and a layer containing a light-emitting organic compound between the lower electrode and the upper electrode.

The light-emitting module 580R includes the first coloring layer 567R on the counter substrate 570. The coloring layer transmits light of a particular wavelength and is, for example, a layer that selectively transmits light of red, green, or blue color. A region that transmits light emitted from the light-emitting element as it is may be provided as well.

The light-emitting module 580R includes the sealant 560 that is in contact with the first light-emitting element 550R and the first coloring layer 567R.

The first coloring layer 567R is positioned in a region overlapping with the first light-emitting element 550R. Accordingly, part of light emitted from the first light-emitting element 550R passes through the sealant 560 that also serves as an optical adhesive layer and through the first coloring layer 567R and is emitted to the outside of the light-emitting module 580R as indicated by an arrow in FIG. 13.

<<Structure of Display Portion>>

The display portion 501 includes a light-blocking layer 567BM on the counter substrate 570. The light-blocking layer 567BM is provided so as to surround the coloring layer (e.g., the first coloring layer 567R).

The display portion 501 includes an anti-reflective layer 567p positioned in a region overlapping with pixels. As the anti-reflective layer 567p, a circular polarizing plate can be used, for example.

The display portion 501 includes an insulating film 521. The insulating film 521 covers the transistor 502t. Note that the insulating film 521 can be used as a layer for planarizing unevenness caused by the pixel circuits. An insulating film on which a layer that can prevent diffusion of impurities to the transistor 502t and the like is stacked can be used as the insulating film 521.

The display portion 501 includes the light-emitting elements (e.g., the first light-emitting element 550R) over the insulating film 521.

The display portion 501 includes, over the insulating film 521, a partition wall 528 that overlaps with an end portion of the lower electrode. In addition, a spacer that controls the distance between the substrate 510 and the substrate 570 is provided on the partition wall 528.

<<Structure of Image Signal Line Driver Circuit>>

An image signal line driver circuit 503s(1) includes a transistor 503t and a capacitor 503c. Note that the image signal line driver circuit 503s(1) can be formed in the same process and over the same substrate as those of the pixel circuits.

<<Other Structures>>

The display portion 501 includes the wirings 511 through which signals can be supplied. The wirings 511 are provided with the terminal 519. Note that the FPC 509(1) through which a signal such as an image signal or a synchronization signal can be supplied is electrically connected to the terminal 519.

Note that a printed wiring board (PWB) may be attached to the FPC 509(1).

This embodiment can be combined with any of the other embodiments in this specification as appropriate.

EXPLANATION OF REFERENCE

13a: connecting member, 13b: connecting member. 15a: support panel, 15b: support panel, 102: substrate, 104a gate electrode, 106: insulating film, 107: insulating film, 108: insulating film, 110: oxide semiconductor film, 112: conductive film, 112a: first electrode, 112b: second electrode, 114: insulating film, 116: insulating film, 118: insulating film. 120: insulating film, 122a: conductive film 122b: conductive film, 122c: gate electrode. 142a opening, 142d: opening, 142e: opening, 151: transistor, 200: display device, 200B: display device, 200C: display device, 200D: display device, 210: control portion, 210B: control portion, 212: synchronization signal supply portion 214: power supply portion, 220: image processing portion, 230: display portion, 230(1): first region, 230(2): second region, 230(1)S: region, 230b(1): boundary, 230b(2): boundary, 232: driver circuit, 232G: scan line driver circuit, 232S: signal line driver circuit, 239: sign. 240: sensing portion, 300: input-output device, 301: display portion, 302: pixel, 302B: sub-pixel, 302G: sub-pixel, 302R: sub-pixel, 302t: transistor. 303c: capacitor, 303g(1): scan line driver circuit, 303g(2): imaging pixel driver circuit, 303s(1): image signal line driver circuit. 303s(2): imaging signal line driver circuit, 303t: transistor, 308: imaging pixel, 308p: photoelectric conversion element, 308t: transistor, 309: FPC, 310: substrate, 310a: barrier film, 310b: substrate, 310c: adhesive layer, 311: wiring, 319: terminal, 321: insulating film. 328: partition wall, 329: spacer, 350R: light-emitting element, 351R: lower electrode. 352: upper electrode, 353: layer, 353a: light-emitting unit, 353b: light-emitting unit, 354: intermediate layer, 360: sealant, 367BM: light-blocking layer. 367p: anti-reflective layer, 367R: coloring layer, 370: counter substrate, 370a: barrier film, 370b: substrate, 370c: adhesive layer, 380B: light-emitting module, 380G: light-emitting module, 380R: light-emitting module, 500: touch panel, 501: display portion, 502R: sub-pixel, 502t: transistor, 503c: capacitor, 503s: image signal line driver circuit, 503t: transistor, 509: FPC, 510: substrate, 510a: barrier film, 510b: substrate. 510c: adhesive layer, 511: wiring, 519: terminal, 521: insulating film, 528: partition wall, 550R: light-emitting element, 560: sealant, 567BM: light-blocking layer, 567p: anti-reflective layer. 567R: coloring layer, 570: substrate, 570a: barrier film, 570b: substrate. 570c: adhesive layer, 580R: light-emitting module, 590: substrate, 591: electrode, 592: electrode, 593: insulating layer, 594: wiring, 595: touch sensor. 597: adhesive layer, 598: wiring, 599: connection layer, 631p: pixel, 634c: capacitor, 634EL: pixel circuit, 634t: transistor, 634t_1: transistor, 634t_2: transistor, 635EL: EL element, E1: high flexibility region, E2: low flexibility region.

This application is based on Japanese Patent Application serial no. 2013-161577 filed with Japan Patent Office on Aug. 2, 2013, the entire contents of which are hereby incorporated by reference.

The invention claimed is:

1. A display device comprising:
a display panel comprising a foldable continuous display portion having a flexibility, the foldable continuous display portion comprising:
 a first region exposed outward when the display device is folded, the first region overlapping with a first housing; and
 a second region folded inward so that part of the second region faces another part of the second region when the display device is folded, the second region overlapping with a second housing;
a first driver circuit electrically connected to the foldable continuous display portion;
a sensing portion configured to sense a state of the foldable continuous display portion and supply data on whether the display device is folded; and
a control portion configured to control the first driver circuit so that, when the sensing portion detects that the display device is folded, the first driver circuit supplies an image signal for displaying an image to the first region while the first driver circuit supplies a signal for displaying a black image to the second region,
wherein the first housing and the second housing are connected via a connection member, and
wherein part of the first region of the foldable continuous display portion is exposed on a side surface of the display device when the display device is folded.

2. The display device according to claim 1, wherein the foldable continuous display portion comprises a light-emitting element.

3. The display device according to claim 1, wherein the foldable continuous display portion comprises a transistor comprising an oxide semiconductor layer.

4. The display device according to claim 3, wherein the oxide semiconductor layer comprises indium and zinc.

5. The display device according to claim 1, comprising a touch sensor over the foldable continuous display portion.

6. The display device according to claim 1, comprising a sign operationally coupled to the sensing portion.

7. The display device according to claim 6, wherein the sign is a magnet.

8. A display device comprising:
a display panel comprising a foldable continuous display portion having a flexibility, the foldable continuous display portion comprising:
 a first region exposed outward when the display device is folded, the first region overlapping with a first housing; and
 a second region folded inward so that part of the second region faces another part of the second region when the display device is folded, the second region overlapping with a second housing;
a first driver circuit electrically connected to the first region of the foldable continuous display portion;
a second driver circuit electrically connected to the second region of the foldable continuous display portion;
a sensing portion configured to sense a state of the foldable continuous display portion and supply data on whether the display device is folded; and
a control portion configured to control the first driver circuit so that, when the sensing portion detects that the display device is folded, the first driver circuit supplies an image signal for displaying an image to the first region while the second driver circuit supplies a signal for displaying a black image to the second region, wherein the first housing and the second housing are connected via a connection member, and wherein part of the first region of the foldable continuous display portion is exposed on a side surface of the display device when the display device is folded.

9. The display device according to claim 8, wherein the foldable continuous display portion comprises a light-emitting element.

10. The display device according to claim 8, wherein the foldable continuous display portion comprises a transistor comprising an oxide semiconductor layer.

11. The display device according to claim 10, wherein the oxide semiconductor layer comprises indium and zinc.

12. The display device according to claim 8, comprising a touch sensor over the foldable continuous display portion.

13. The display device according to claim 8, comprising a sign operationally coupled to the sensing portion.

14. The display device according to claim 13, wherein the sign is a magnet.

15. A display device comprising:
a display panel comprising a foldable continuous display portion having a flexibility, the foldable continuous display portion comprising:
    a first region exposed outward when the display device is folded; and
    a second region folded inward so that part of the second region faces another part of the second region when the display device is folded;
a first scan line driver circuit electrically connected to the first region of the foldable continuous display portion;
a second scan line driver circuit electrically connected to the second region of the foldable continuous display portion; and
a sensing portion configured to sense a state of the foldable continuous display portion and supply data on whether the display device is folded, wherein an image signal for displaying an image is supplied to the first region and a signal for displaying a black image is supplied to the second region in accordance with the state of the foldable continuous display portion sensed by the sensing portion, wherein the first scan line driver circuit and the second scan line driver circuit are configured to supply signals at different frequencies, and wherein part of the first region of the foldable continuous display portion is exposed on a side surface of the display device when the display device is folded.

16. The display device according to claim 15, wherein the foldable continuous display portion comprises a light-emitting element.

17. The display device according to claim 15, wherein the foldable continuous display portion comprises a transistor comprising an oxide semiconductor layer.

18. The display device according to claim 17, wherein the oxide semiconductor layer comprises indium and zinc.

19. The display device according to claim 15, comprising a touch sensor over the foldable continuous display portion.

20. The display device according to claim 15, comprising a sign operationally coupled to the sensing portion.

21. The display device according to claim 20, wherein the sign is a magnet.

* * * * *